(12) United States Patent
Sasaki et al.

(10) Patent No.: US 12,536,493 B2
(45) Date of Patent: Jan. 27, 2026

(54) SYSTEM AND METHOD FOR REVERSE LOGISTICS OPERATIONS

(71) Applicant: FUNAI SERVICE CORPORATION, Groveport, OH (US)

(72) Inventors: Yoshihiro Sasaki, Hilliard, OH (US); Ibrahim M. Sardar, Avon, IN (US); Fumiyo Hines, Staten Island, NY (US); Nobuyuki Shiroma, Columbus, OH (US); Darren Lee Bowen, Kingston, OH (US); Sumire Kawana, Dublin, OH (US); Kyungnim Chen, Chino Hills, CA (US)

(73) Assignee: FUNAI SERVICE CORPORATION, Groveport, OH (US)

( * ) Notice: Subject to any disclaimer, the term of this patent is extended or adjusted under 35 U.S.C. 154(b) by 59 days.

(21) Appl. No.: 18/291,683

(22) PCT Filed: Jul. 30, 2022

(86) PCT No.: PCT/US2022/038977
§ 371 (c)(1),
(2) Date: Jan. 24, 2024

(87) PCT Pub. No.: WO2023/009881
PCT Pub. Date: Feb. 2, 2023

(65) Prior Publication Data
US 2024/0242171 A1 Jul. 18, 2024

Related U.S. Application Data

(60) Provisional application No. 63/227,773, filed on Jul. 30, 2021.

(51) Int. Cl.
*G06Q 10/0837* (2023.01)

(52) U.S. Cl.
CPC .................. *G06Q 10/0837* (2013.01)

(58) Field of Classification Search
CPC .. G06Q 10/0837; G06Q 10/087; G06Q 20/32; G06Q 30/0641
(Continued)

(56) References Cited

U.S. PATENT DOCUMENTS 7,251,611 B2 7/2007 Abbott et al.
7,660,721 B2 2/2010 Williams et al.
(Continued)

OTHER PUBLICATIONS

"Returning mail-order goods: analyzing the relationship between the rate of returns and the associated costs" Published by Springer Nature Link (Year: 2015).*

*Primary Examiner* — Zeina Elchanti
(74) *Attorney, Agent, or Firm* — Porter Wright Morris & Arthur LLP

(57) ABSTRACT

A system and method for securely managing reverse logistics information of returned products includes the steps of receiving a plurality of Return Merchandise Authorizations (RMAs) each with returned product information from a return party, and receiving return product information taken from actual returned product of a shipment received by the return processing party. It is automatically determined whether there is a discrepancy between the returned product information for a related one of the RMAS from the return party and the actual return product information from the shipment taken by the return processing party. If a minor discrepancy is determined, a record is automatically saving of the minor discrepancy and processing the actual returned product having the minor discrepancy is continued. If a major discrepancy is determined, the actual returned product having the major discrepancy is automatically held from further processing.

14 Claims, 26 Drawing Sheets

(58) Field of Classification Search
USPC .......................................................... 705/340
See application file for complete search history.

(56) References Cited

U.S. PATENT DOCUMENTS

| | | | |
|---|---|---|---|
| 7,881,965 | B2 | 2/2011 | Bowles et al. |
| 7,890,373 | B2 | 2/2011 | Junger |
| 8,200,533 | B2 | 6/2012 | Librizzi et al. |
| 8,239,262 | B2 | 8/2012 | Bowles et al. |
| 8,408,459 | B1 | 4/2013 | Alnzo et al. |
| 8,423,404 | B2 | 4/2013 | Bowles et al. |
| 8,504,309 | B1 | 8/2013 | Spoor et al. |
| 8,600,913 | B2 | 12/2013 | Williams et al. |
| 8,712,856 | B2 | 4/2014 | Junger et al. |
| 9,033,230 | B2 | 5/2015 | Combs et al. |
| 9,053,451 | B2 | 6/2015 | Gventer et al. |
| 9,183,100 | B2 | 11/2015 | Gventer et al. |
| 9,251,494 | B2 | 2/2016 | Gventer et al. |
| 9,311,488 | B2 | 4/2016 | Gventer et al. |
| 9,396,452 | B2 | 7/2016 | Gventer et al. |
| 9,465,702 | B2 | 10/2016 | Gventer et al. |
| 9,495,367 | B2 | 11/2016 | Mccarty |
| 9,575,973 | B2 | 2/2017 | Mccarty et al. |
| 9,760,855 | B2 | 9/2017 | Gventer et al. |
| 9,846,871 | B2 | 12/2017 | Junger et al. |
| 9,904,911 | B2 | 2/2018 | Bowles |
| 9,921,923 | B2 | 3/2018 | Gventer et al. |
| 9,922,302 | B2 | 3/2018 | Gventer et al. |
| 10,102,381 | B2 | 10/2018 | Gventer et al. |
| 10,152,686 | B2 | 12/2018 | Gventer et al. |
| 10,325,098 | B2 | 6/2019 | Gventer et al. |
| 10,475,040 | B2 | 11/2019 | Singh |
| 10,579,957 | B1 | 3/2020 | Mccarthy et al. |
| 10,592,858 | B2 | 3/2020 | Subramanian |
| 10,692,858 | B2 | 6/2020 | Heo |
| 10,708,406 | B2 | 7/2020 | Huang |
| 10,810,535 | B2 | 10/2020 | Engel et al. |
| 10,825,082 | B2 | 11/2020 | Librizzi et al. |
| 2002/0049622 | A1 | 4/2002 | Lettich et al. |
| 2004/0181310 | A1 | 9/2004 | Stashluk, Jr. et al. |
| 2004/0193438 | A1 | 9/2004 | Stashluk, Jr. et al. |
| 2004/0194056 | A1 | 9/2004 | Combs et al. |
| 2004/0215531 | A1 | 10/2004 | Stashluk, Jr. et al. |
| 2004/0236641 | A1 | 11/2004 | Abbott et al. |
| 2007/0021877 | A1 | 1/2007 | McDonough et al. |
| 2007/0156439 | A1 | 7/2007 | Fyda et al. |
| 2008/0071627 | A1 | 3/2008 | Junger |
| 2010/0169231 | A1 | 7/2010 | Bowles et al. |
| 2010/0217715 | A1 | 8/2010 | Lipcon |
| 2010/0228676 | A1 | 9/2010 | Librizzi et al. |
| 2010/0262481 | A1 | 10/2010 | Baker et al. |
| 2011/0235853 | A1 | 9/2011 | Bowles et al. |
| 2011/0251911 | A1 | 10/2011 | Junger et al. |
| 2012/0254046 | A1 | 10/2012 | Librizzi et al. |
| 2012/0294490 | A1 | 11/2012 | Bowles et al. |
| 2013/0138533 | A1 | 5/2013 | Vartanian et al. |
| 2013/0218784 | A1 | 8/2013 | Alonzo et al. |
| 2013/0226679 | A1 | 8/2013 | Bowles |
| 2014/0108125 | A1 | 4/2014 | Maraz et al. |
| 2014/0207599 | A1 | 7/2014 | Junger et al. |
| 2016/0110722 | A1 | 4/2016 | Reddy et al. |
| 2017/0323264 | A1 | 11/2017 | Subramanian |
| 2017/0330158 | A1 | 11/2017 | Librizzi et al. |
| 2018/0144295 | A1* | 5/2018 | Engel ................ G06Q 10/0833 |
| 2018/0144296 | A1 | 5/2018 | Engel et al. |
| 2018/0144301 | A1 | 5/2018 | Engel et al. |
| 2018/0247280 | A1 | 8/2018 | Bowles |
| 2019/0335033 | A1 | 10/2019 | Huang |
| 2020/0019972 | A1 | 1/2020 | Maragelis |
| 2020/0051018 | A1 | 2/2020 | Shamiss |
| 2020/0126027 | A1* | 4/2020 | Mahajan .............. G06Q 10/087 |
| 2020/0241891 | A1 | 7/2020 | Li et al. |
| 2020/0242751 | A1 | 7/2020 | Li et al. |
| 2020/0304623 | A1 | 9/2020 | Huang |
| 2020/0344658 | A1 | 10/2020 | Huang et al. |

* cited by examiner

SYSTEM AND METHOD FOR REVERSE LOGISTICS OPERATIONS

FIELD OF THE INVENTION

The field of the present invention generally relates to reverse or inverse logistics operations and, more particularly, to systems and methods for correcting mistakes in reverse logistics operations without sacrificing productivity in processing.

BACKGROUND OF THE INVENTION

The U.S. retail market typically allows post-purchase return of products In fact, 10% or more of products purchased in the U.S. are returned according to recent data. Most product returns are due to either dissatisfaction with the purchased products or change or heart on the purchased products. The percentage of product returns due to product defects or product damage is rather small. As a result, retailers are taking generous measures against returns as a means of increasing customer satisfaction. While the retailers agree that sales cannot be established without allowing post-purchase returns, they are looking for ways to reduce return costs since return costs are significant from a business perspective. Some data indicates that the cost resulting from product returns represents 10% of total sales. Thus, reducing return costs is a major concern for retailers.

From a consumer's perspective, return processing seems to be completed when the consumer returns a purchased product to a retailer. However, this product return is actually just the start of a complex logistics operation involving retailers, shipping companies, product suppliers and return processing companies that all work together to form a reverse supply chain often referred to as reverse logistics. A return processing or reverse logistics company is in the business of transporting, consolidating, refurbishing and reselling product returns. They always aim to process product returns at the lowest cost, which means transporting efficiently without damage, refurbishing while maintaining high quality and productivity and selling at the right price at the right time.

Often, various product returns are mixed and combined with other shipments and then shipped to the return processing company. As a result, the connection between products and data tends to get lost, unlike forward logistics. In addition, operations within return processing companies, which is the final destination, are generally labor intensive and can lead to human errors such as product mixing. This means that product returns are subject to the risk of calculation error in both physical and data terms.

Excellent return processing operations are facilitated by balancing accuracy and productivity while considering the above-identified risk. In particular, the following operations are typically performed.

Pre-Return Processing (RMA Issuance and Approval) Initially, a retailer requests approval of a Return Merchandise Authorization (RMA) from a product supplier when the retailer collects a certain volume of products of that product supplier that have been returned by consumers. The product supplier approves the RMA after examining the content of the request. The RMA contains information on the model number, quantity and serial number of each of the products, but errors are typically present. Therefore, if there is a calculation error, the downstream process requires a retroactive validation of the accuracy of the RMA.

Shipping An approved RMA is often shipped in part instead of in full. Also, multiple RMAs are usually combined and shipped. In this case, special attention is required because the original RMA information and the physical product must be matched when it travels.

Receiving by Return Processing Companies Various validations and corrections of errors are carried out upon receipt. First, validation is performed to determine if the RMA and the returned product match. However, if the RMA is split or combined with other RMAs and then shipped, the validation itself becomes difficult. For example, if only half of a certain RMA has been delivered. Not only are errors in the model number and quantity checked, but also incompleteness of the RMA as well as the model number and quantity of the RMA remaining for future delivery must be managed. If several RMAs are combined and shipped, careful handling is necessary to prevent the mismatch of physical products and RMAs.

If an event requiring a correction occurs, the process that caused the calculation error must be identified and the request for correction must be made to the person in charge. The later the error is detected, the greater the number of steps from the moment the error occurs to the moment the error is detected, which leads to an increase in cost (manpower and time) for correction. Therefore, it is important to detect and correct errors at an early stage and to keep accurate information to reduce costs.

Functional Inspection and Repair How the returned products are treated is determined based on the market price of the refurbished products. If the market price of the refurbished products is not sufficient, the products may be sold as is. Also, products damaged on arrival are sent to scrap processing. For products that need to be refurbished, if they are considered to be defective through pre-defined appearance and functional inspection, the repairer will repair the products. In this case, if the additional cost (cost of labor and parts) required for repair is expensive, they may be scrapped as beyond economic repair. Products that have passed the functional check and those that have completed repair are cleaned and then packaged with the included items, including accessories, to become refurbished products.

Quality Control The quality of the refurbished products is always put into doubt by the buyers. And quality control processes are critical to making consumers comfortable with their purchase. There are various ways to do this, but the most ideal way is to predefine a quality target, check mixing of defects on a pullout basis, and perform a total inspection of the lot pulled out if necessary.

Sales, Inventory Management and Shipping Shipping is done according to orders from buyers. There are bulk sales and unit sales patterns, but that process is basically the same as the sale and shipment of new products. However, since returns tend to be a mixture of various kinds and in small quantities, if the inventory management is poor, issues such as insufficient inventory at the shipping stage and shipping the wrong product will occur.

Thus it is clear that reverse logistics operations have unique difficulties that forward logistics operations do not. Accordingly, there is a need for computer implemented systems and methods for improving accuracy in reverse logistics operations without sacrificing productivity in processing.

SUMMARY OF THE INVENTION

Disclosed are systems and methods for managing reverse logistics operations that overcome at least one of the disadvantages of the prior art described above. Disclosed is a method for securely managing reverse logistics information of returned products, implemented on an information computing machine. The method comprises the steps of: (a) receiving, by the information computing machine, a plurality of Return Merchandise Authorizations (RMAs) each with returned product information from a return party; (b) receiving, by the information computing machine, return product information taken from actual returned product of a shipment received by the return processing party; (c) automatically determining, by the information computing machine, whether there is a discrepancy between the returned product information for a related one of the RMAs from the return party and the actual return product information from the shipment taken by the return processing party; (d) if a minor discrepancy is determined by the information computing machine, automatically saving a record of the minor discrepancy and continuing to process the actual returned product having the minor discrepancy; and (e) if a major discrepancy is determined by the information computing machine, automatically holding from further processing the actual returned product having the major discrepancy.

Also disclosed is a reverse logistics management system comprising at least one processor and memory storing instructions. The instructions when executed by the at least one processor of the reverse logistics management system, cause the reverse logistics management system to: (a) receive, by the information computing machine, a plurality of Return Merchandise Authorizations (RMAs) each with returned product information from a return party; (b) receive, by the information computing machine, return product information taken from actual returned product of a shipment received by the return processing party; (c) automatically determine, by the information computing machine, whether there is a discrepancy between the returned product information for a related one of the RMAs from the return party and the actual return product information from the shipment taken by the return processing party; (d) if a minor discrepancy is determined by the information computing machine, automatically save a record of the minor discrepancy and continuing to process the actual returned product having the minor discrepancy; and (e) if a major discrepancy is determined by the information computing machine, automatically hold from further processing the actual returned product having the minor discrepancy.

From the foregoing disclosure and the following more detailed description of various preferred embodiments it will be apparent to those skilled in the art that the present invention provides a significant advance in the technology and art of systems and methods for reverse logistics operations. Particularly significant in this regard is the potential the invention affords for providing systems and methods that balance accuracy and productivity. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

DETAILED DESCRIPTION OF CERTAIN PREFERRED EMBODIMENTS

It will be apparent to those skilled in the art, that is, to those who have knowledge or experience in this area of technology, that many uses and design variations are possible for the systems and methods for reverse logistics operations disclosed herein. The following detailed discussion of various alternative and preferred embodiments will illustrate the general principles of the invention. Other embodiments of the present invention suitable for other applications will be apparent to those skilled in the art given the benefit of this disclosure.

Figure 1:
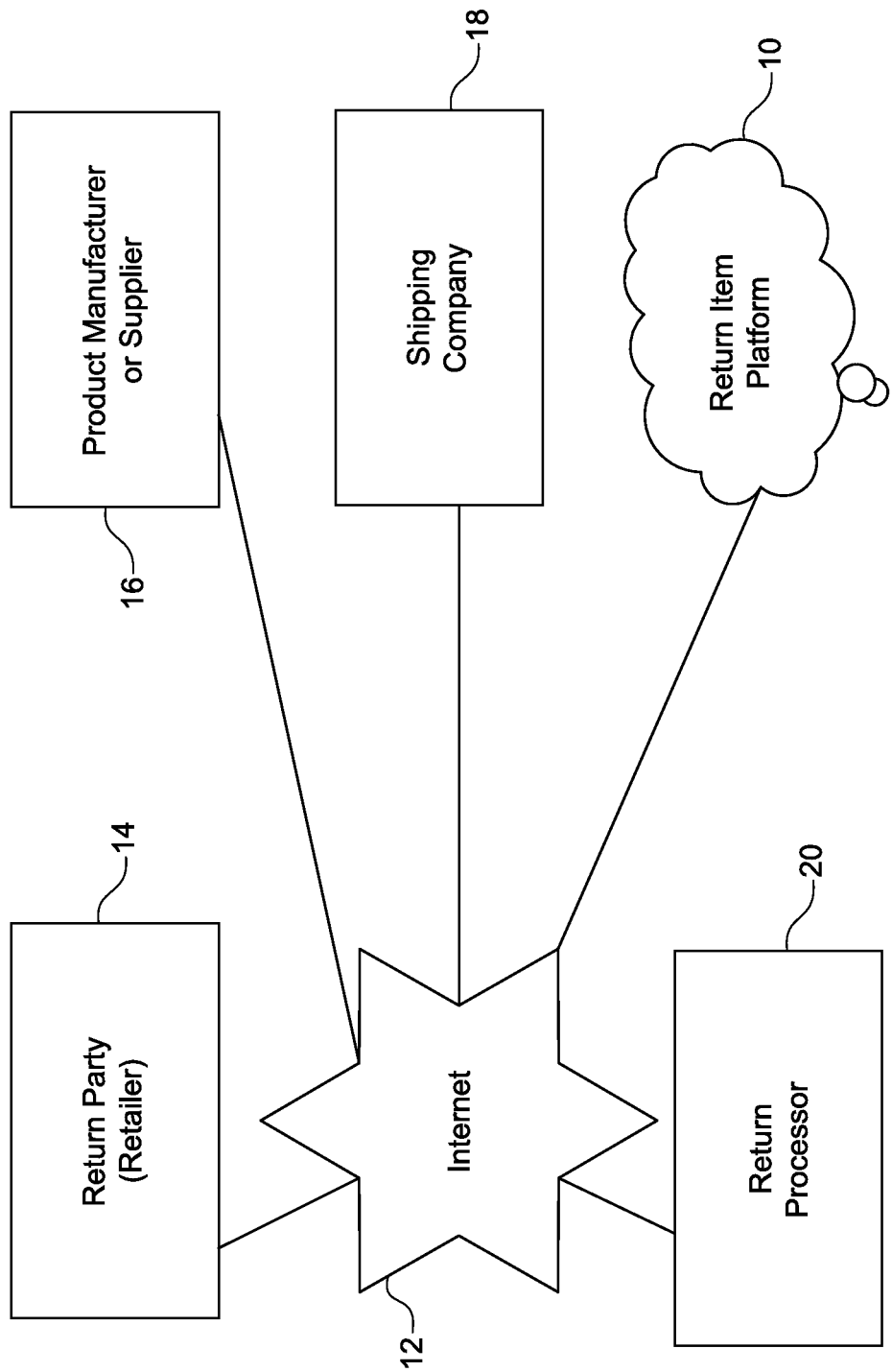
FIG. 1 is a diagrammatic view of a return item management platform according to a the present invention.

Referring now to the drawings, FIG. 1 shows a web-based universal or return management system or platform 10 for reverse logistics operations according to the present invention. The illustrated return management platform 10 is electronically and securely accessible by each the parties of a reverse logistic operation via the Internet 12 and covers all processes starting from return request, request authorization, receive, refurbish, repair, inventory management, sell, and ship out. The illustrated parties of the reverse logistic operation are a return party (such as, for example, a retailer) 14 to whom customers have returned purchased products, a product manufacturing party or supplier 16 who supplied the returned purchased products to the return party 14, a shipper or shipping party 18 who transports the returned purchased items from the return party 14 to a return processor 20 (sometimes referred to as reverse logistics processor). It is noted that the reverse logistics operation can include any combination of the illustrated parties and/or any other suitable parties. It is also noted that all of the parties can be separate entities or companies or any two or more of the illustrated parties can be part of the same entity or company. The illustrated return item platform 10 is cloud based but it is noted that the return item platform 10 can alternatively reside at any other suitable location such as a computer network of one or more of the parties of a reverse logistic operation such as, for example, the return processing company 20. While the illustrated embodiment utilizes the Internet, 12 it is noted that any other suitable computer network can alternatively be utilized.

As consumers return purchased products to the return party 14, the return party 14 collects the returned purchased products, typically in a warehouse. The products can be any type of consumer goods including, but not limited to, electronics, clothing, footwear, furniture, and the like. Once the retailer 14 collects a certain volume of returned purchased products supplied by the product supplier 16, the return party 14 requests approval of a Return Merchandise Authorization (RMA) from the product supplier 16. The product supplier 16 approves or denies the RMA after examining the content of the request. The RMA typically contains information on model number, quantity, and serial number of each of the returned purchased products, but errors and/or missing information are typically present. Note that the return party 14 typically does not have full information about the returned purchased products and relies on the return processing party 20 to collect it. The return item platform 10*m* enables the parties to collect the return information in real time with proper verification.

Once an RMA is approved by the product supplier 16, the return party 14 utilizes a shipper 18 to transport the returned purchased products from a facility of the return party 14 to a facility of the return processing party 20. Ideally the shipping manifest includes the RMA number and a list of serial numbers, but in reality the manifest includes a unit quantity per model without serial numbers. An approved RMA is often shipped in part instead of in full. Also, multiple RMAs are often combined and shipped together.

Figure 2:
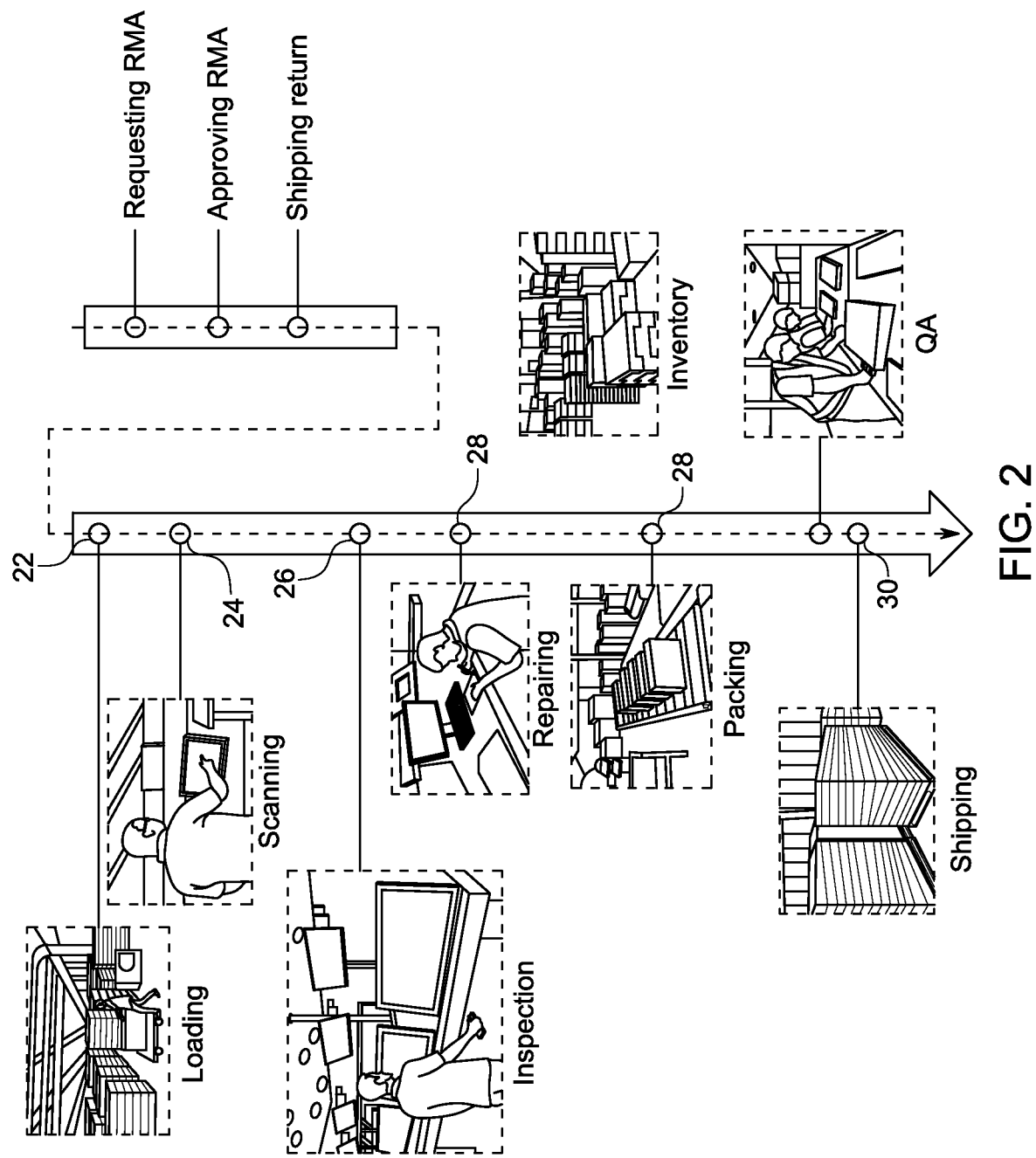
FIG. 2 is diagrammatic view of a flow path for returned purchased items at a return processor facility.

Once the shipper 18 delivers the shipment to the return processing party 20, the return processing party 20 counts the actual delivered quantity by units or by pallets according to the return contract type (i.e. return by unit or by pallet) of the RMA in the shipment. Validation is performed to determine if the expected return shipment information and the actual return shipment information match and upon validation, a unique identifier for shipment-RMA combination is assigned to each unit or each pallet according to the return contract type of the RMA. Next, the return processing party 20 processes the returned purchased items. As best shown in FIG. 2, the return processor 20 first loads the returned products onto a conveyor system 22 so the returned products travel to a receiving station. At the receiving station 24 various validations are carried out upon receipt. Validation is performed to determine if the RMA information and the actual returned products match. Not only are errors in the model numbers and quantity checked, but also incompleteness of the RMA. Upon validation a unique identifier is assigned to each returned product and validated information is scanned into the return management platform. If a critical or major error is discovered upon validation, the error is reported and the returned product cannot be processed until a correction is made. If a non-critical or minor error is discovered, the error is reported but the returned product can continue to be processed. In this manner, the return management platform enables timely correction of critical or major errors and uninterrupted return processing to maintain accuracy and productivity.

The returned products next travel to an inspection station 26. How the returned products are treated at the inspection station is determined based on the market price of refurbished products. If the market price of the refurbished products is not sufficient, the returned products may be sold as is. If the inspection shows that the returned products are damaged beyond refurbishing, they are sent to scrap processing. For returned products that need to be refurbished, if they are considered to be defective through pre-defined appearance and functional inspection, they are moved on to a repair station 28 where the returned products are repaired/refurbished as needed. In this case, if the additional cost (cost of labor and parts) required for repair is expensive, they may be scrapped as beyond economic repair. Products that have passed the functional check and those that have completed repair are cleaned and then moved to a packing station 28 where they are packaged with the included items, including accessories, to become refurbished products ready for shipment.

At a shipping station 30, shipping is done according to orders from buyers. There can be bulk sales and unit sales, but that process is basically the same as the sale and shipment of new products.

Figure 3A:
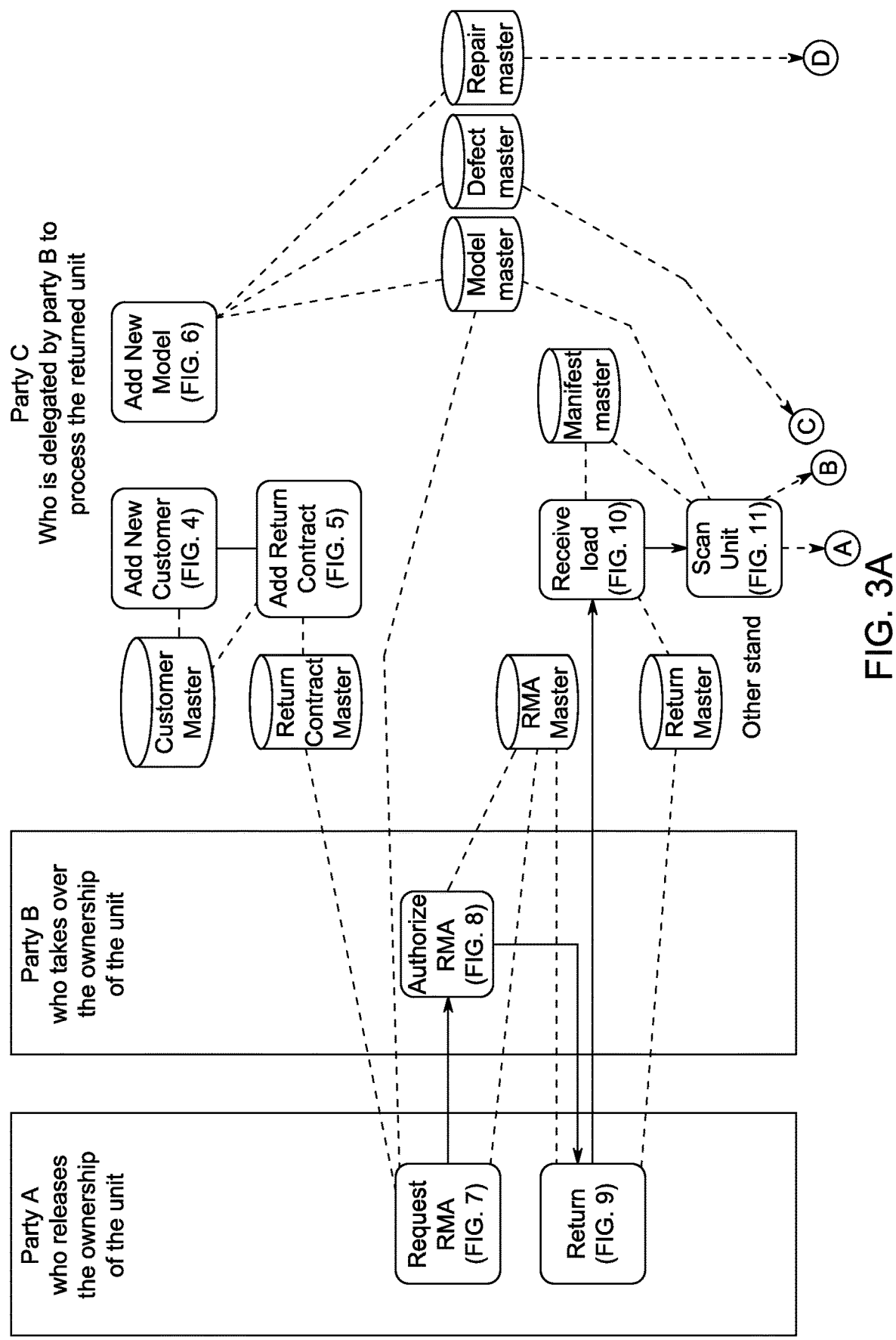
FIGS. 3A and 3B are an overall flow chart for a reverse logistics operation utilizing the return item platform of FIG. 1.
Figure 3B:
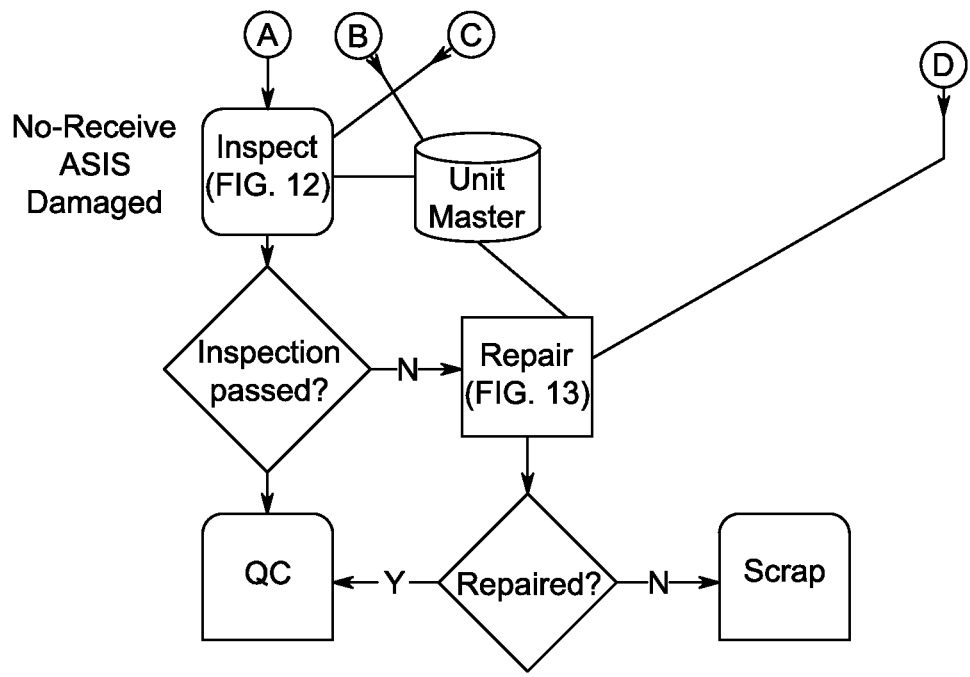
Figure 4:
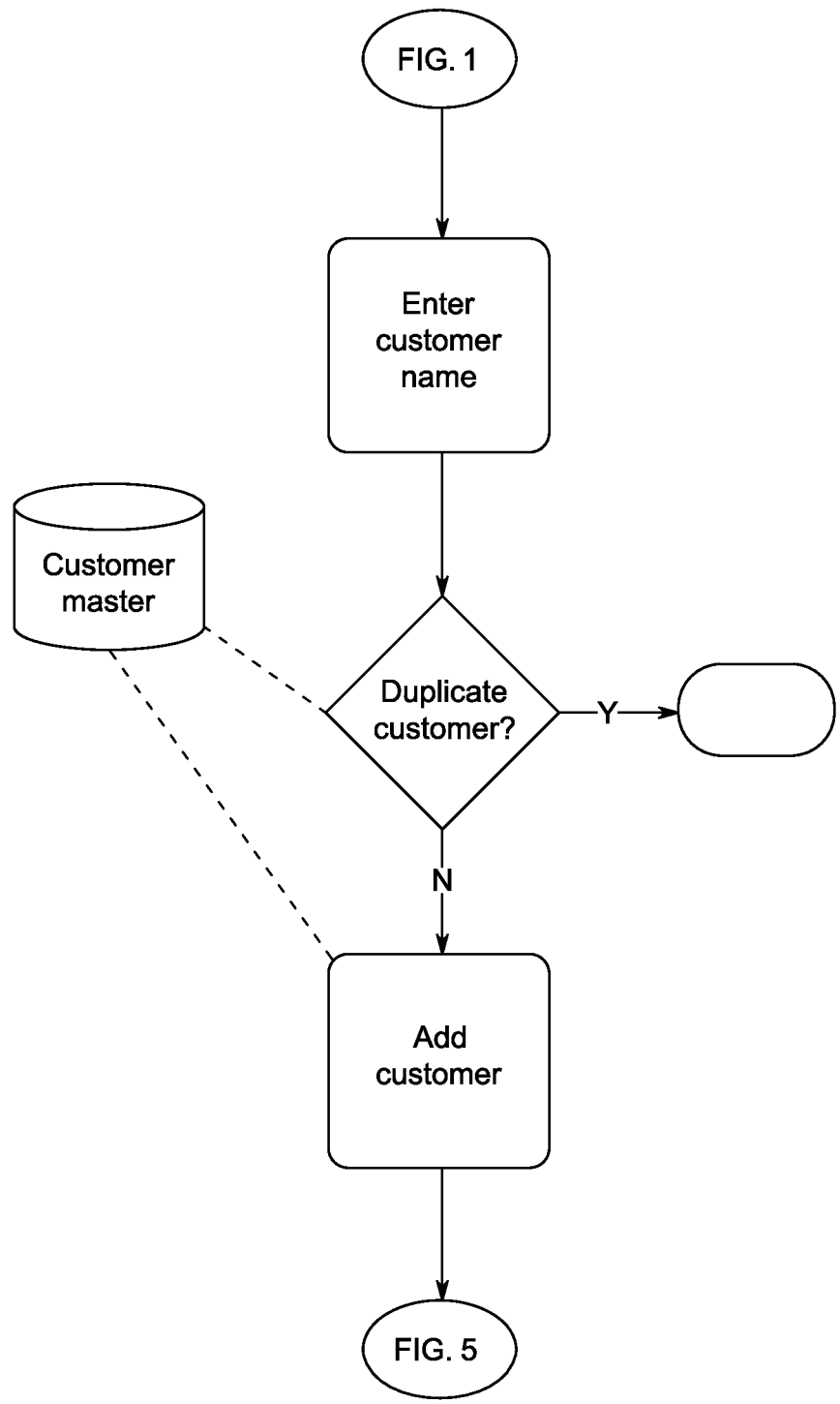
FIG. 4 is a block diagram showing adding a new customer for the return item platform of FIG. 1.
Figure 5A:
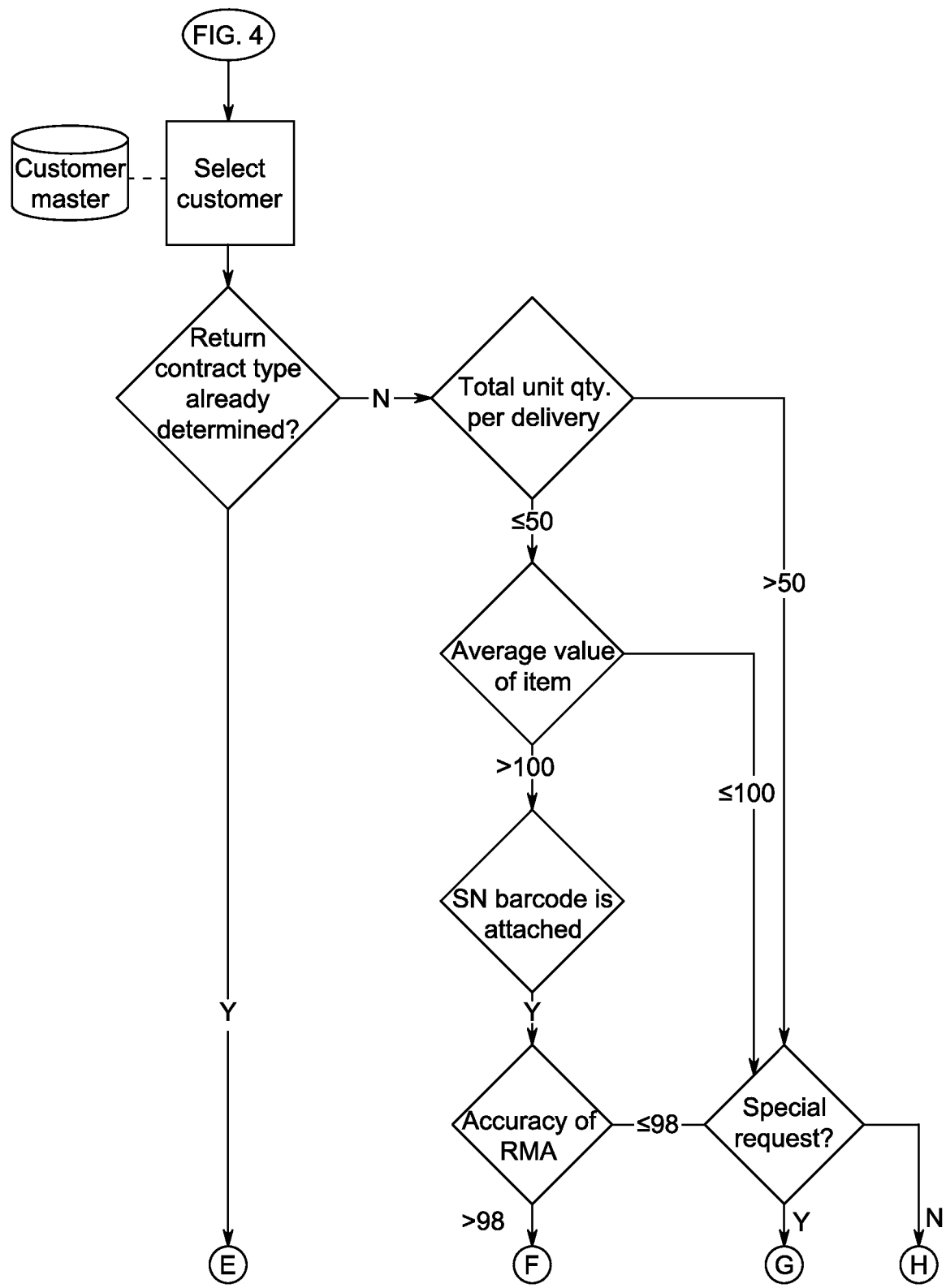
FIGS. 5A and 5B are a block diagram showing creating a return contract based on a selected contract type for a customer following FIG. 4.
Figure 5B:
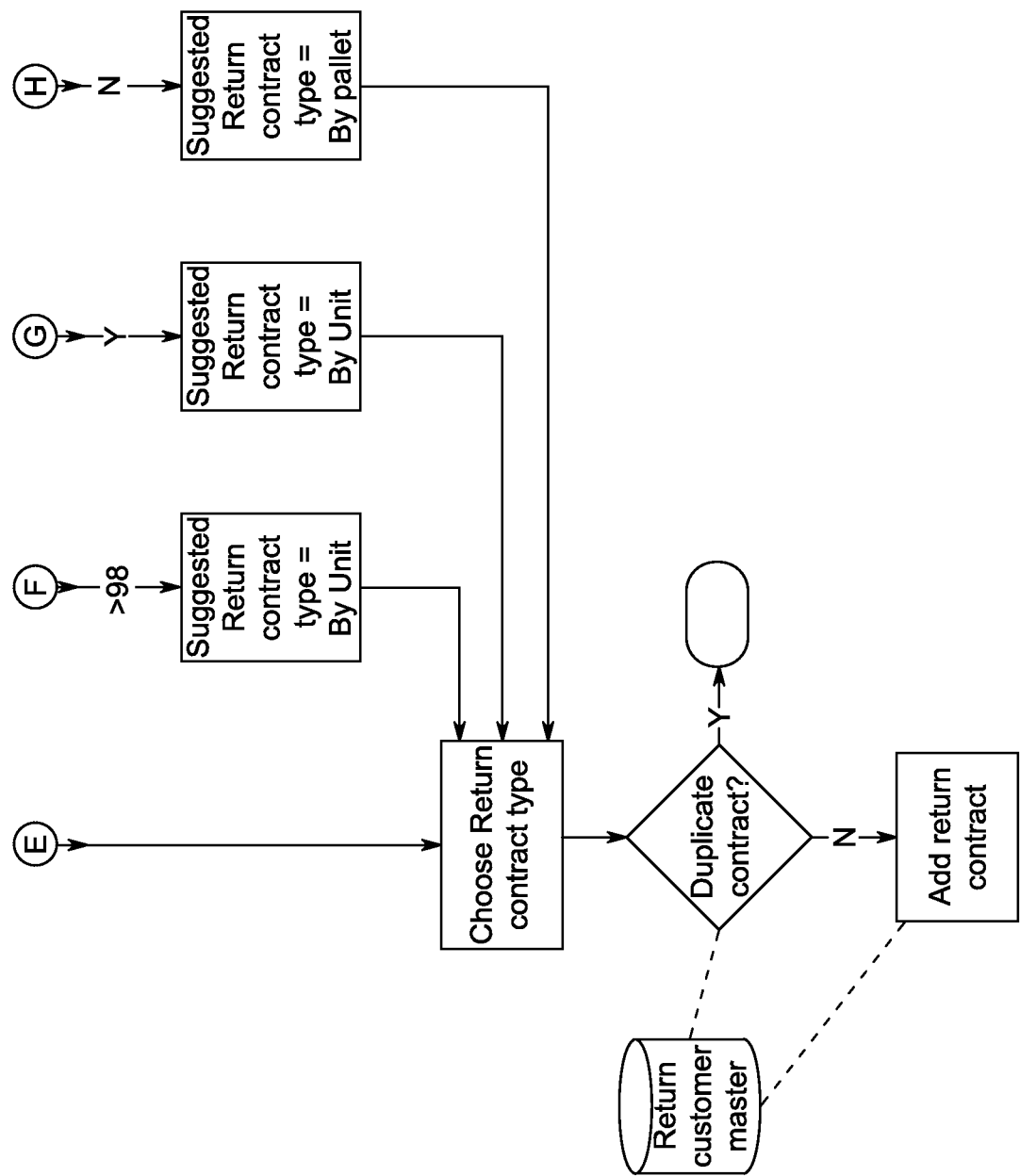
Figure 6A:
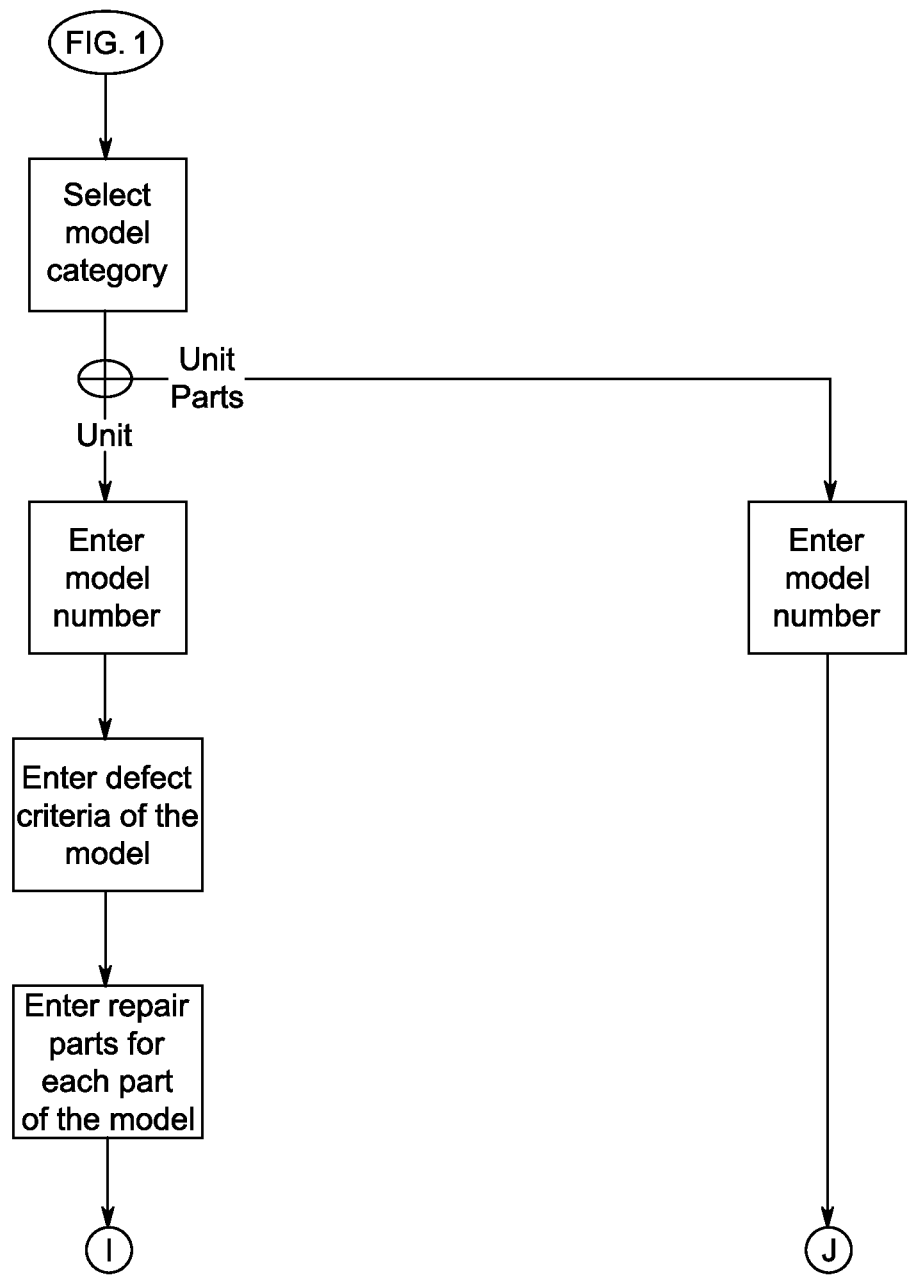
FIGS. 6A and 6B are a block diagram showing registering model information for the return item platform of FIG. 1.
Figure 6B:
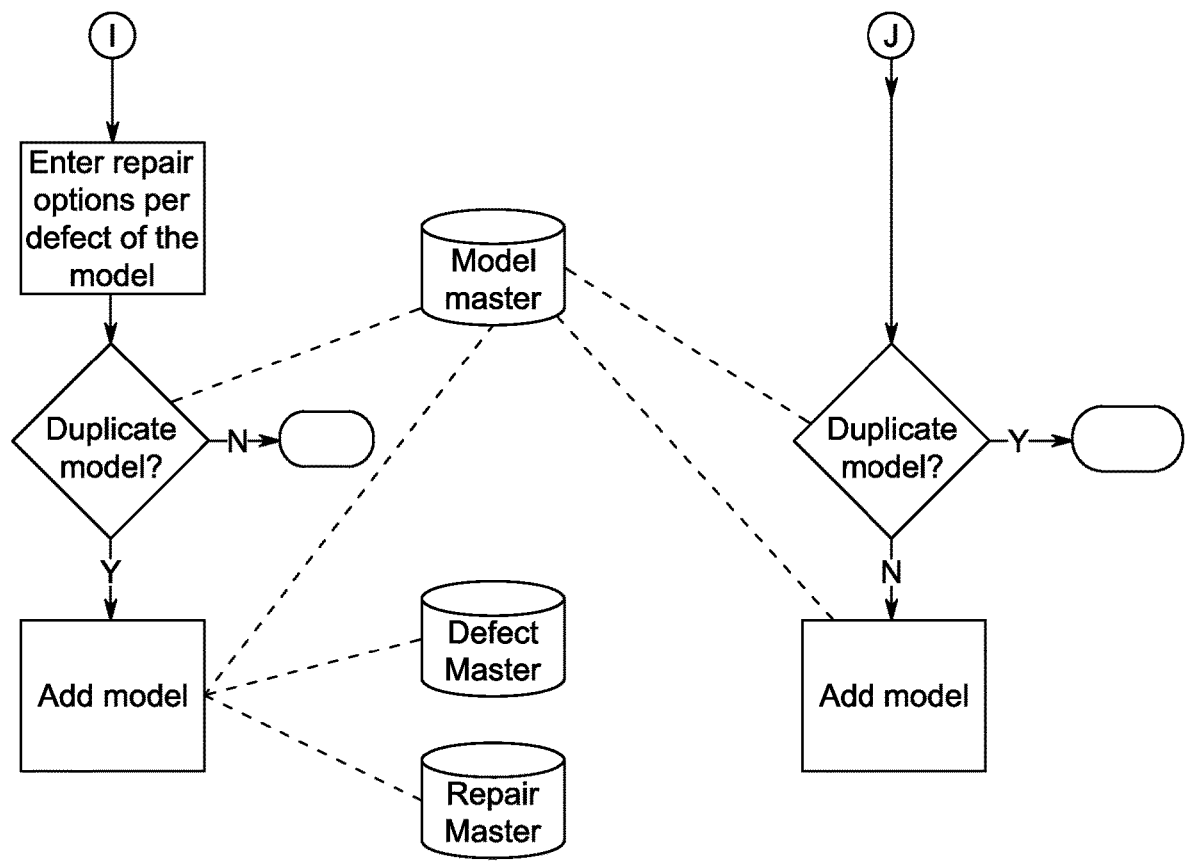
Figure 7A:
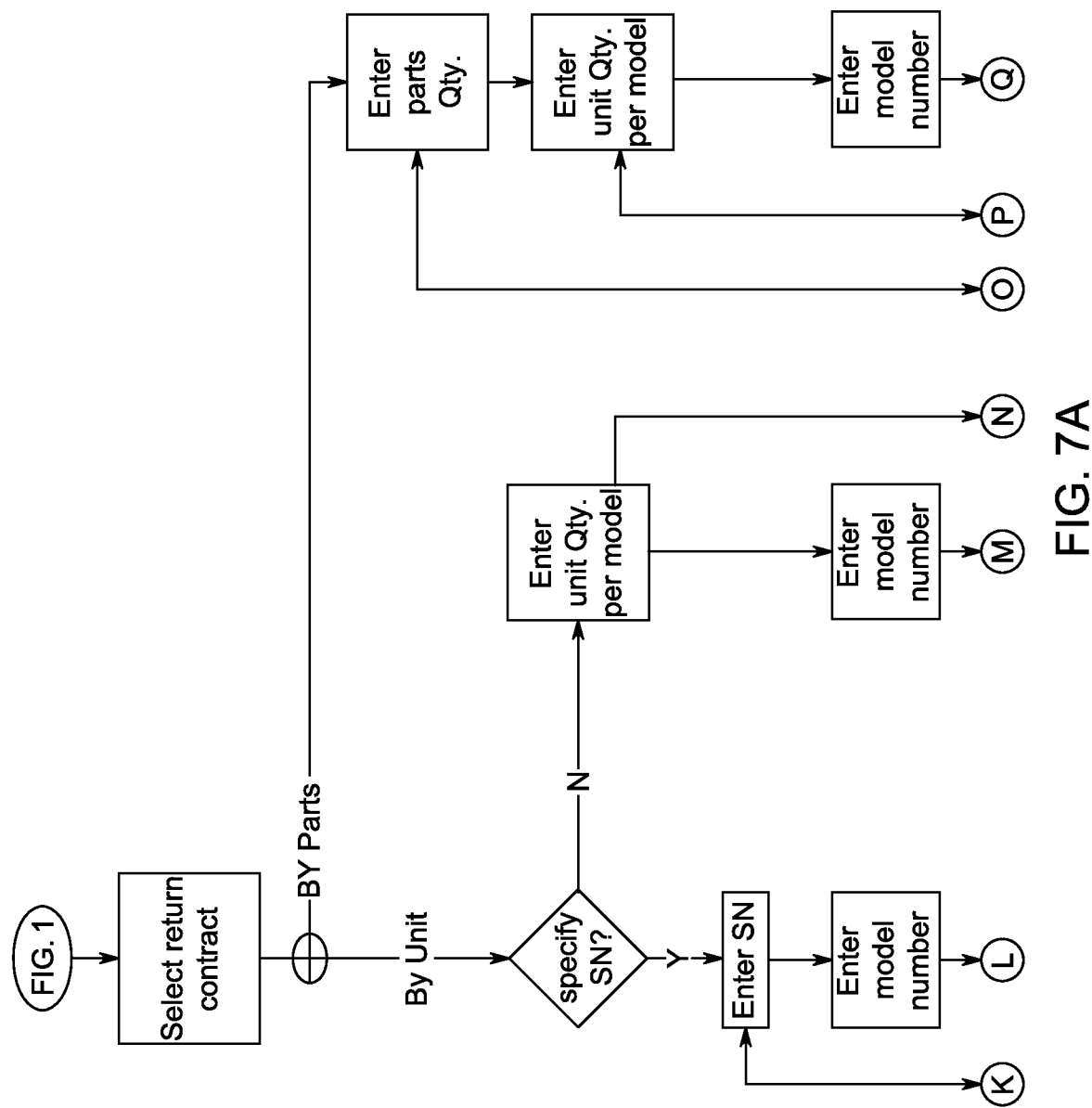
FIGS. 7A and 7B are a block diagram showing creating a request for RMA by pallet or by unit for the return item platform of FIG. 1.
Figure 7B:
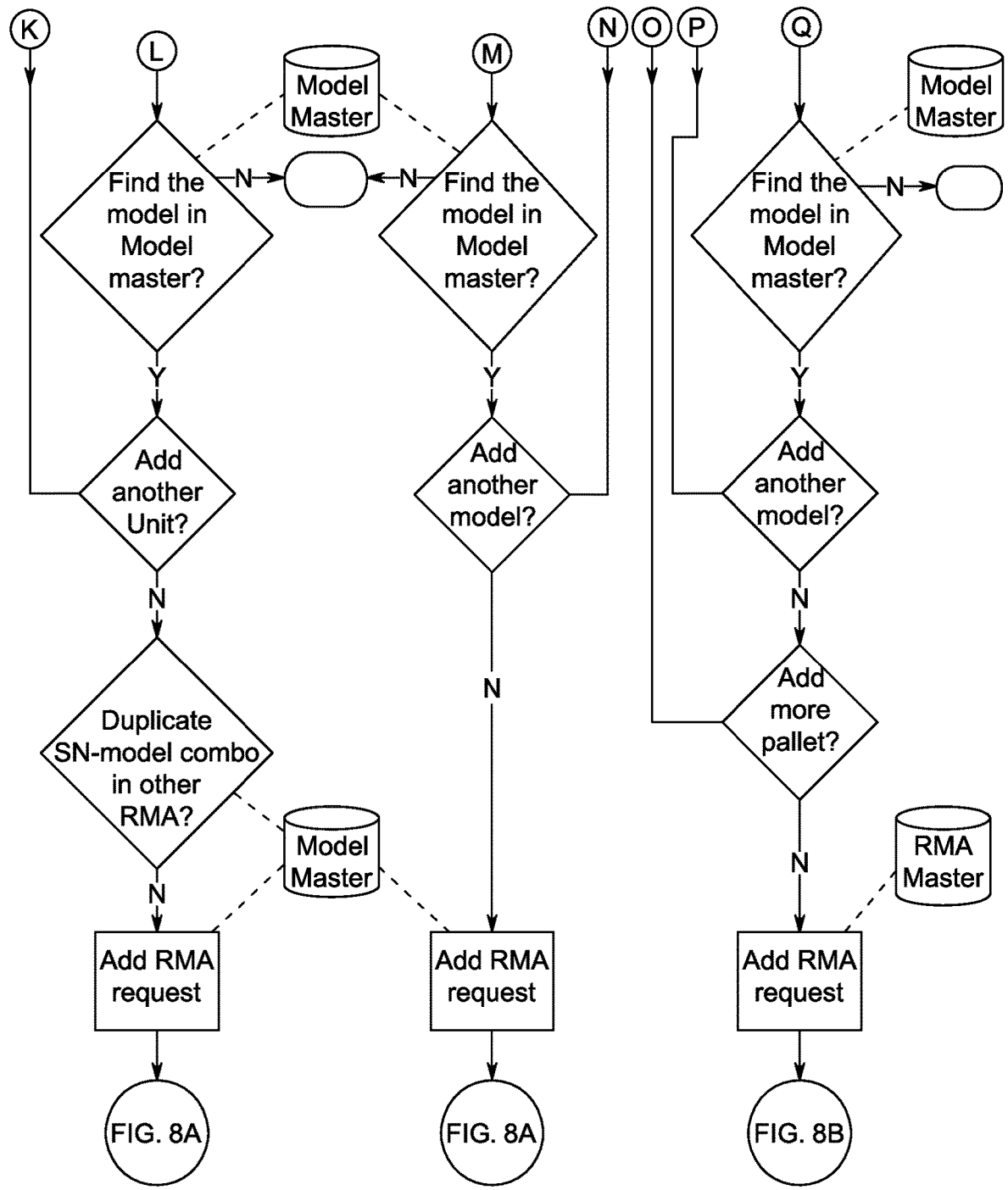
Figure 8A:
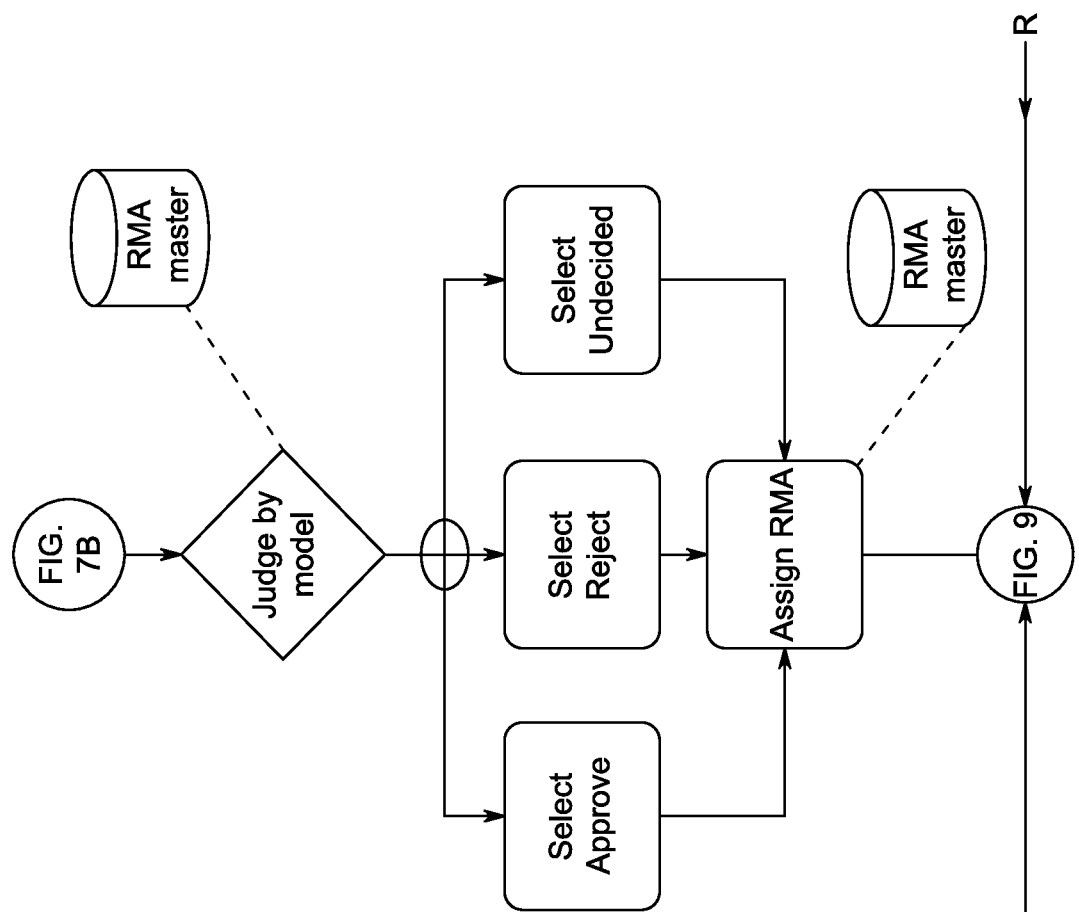
FIGS. 8A and 8B are a block diagram showing reviewing and approving RMA following FIGS. 7A and 7B.
Figure 8A:
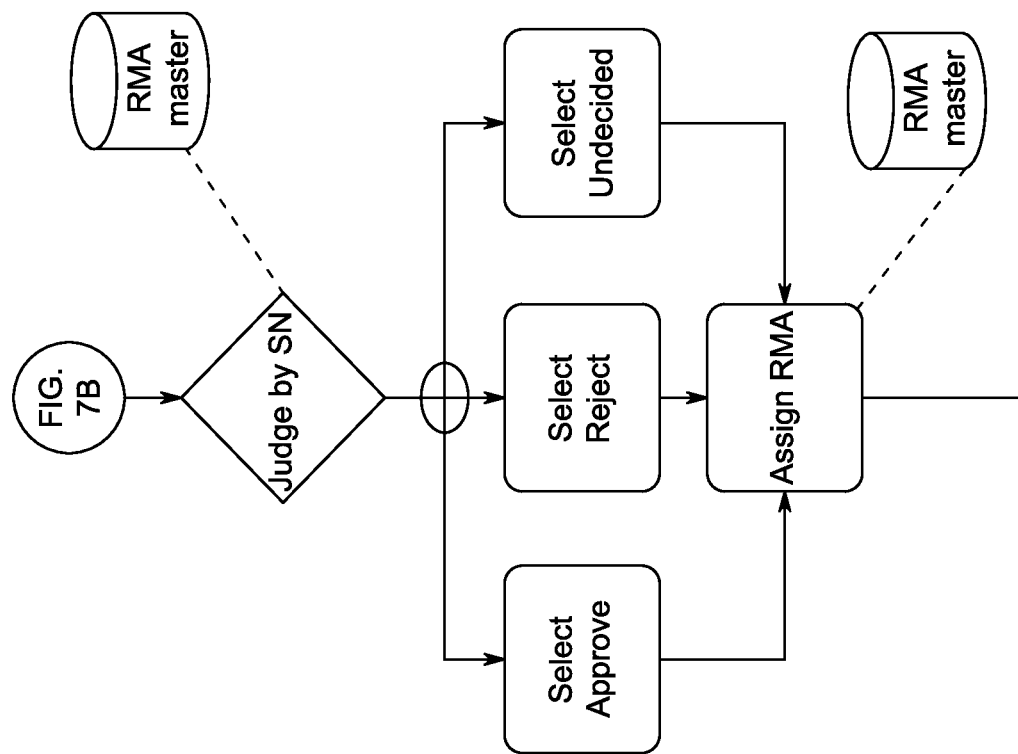
Figure 8B:
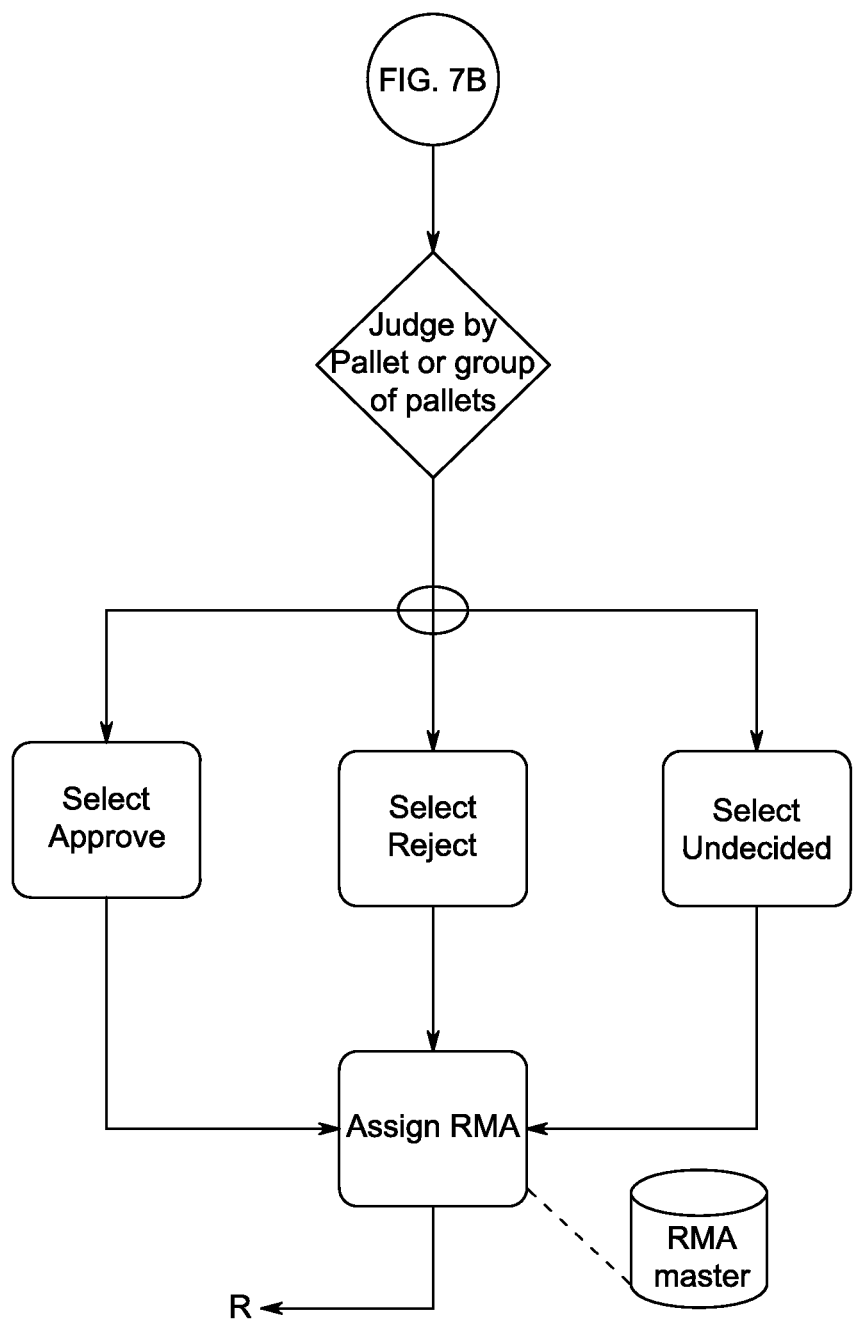
Figure 9A:
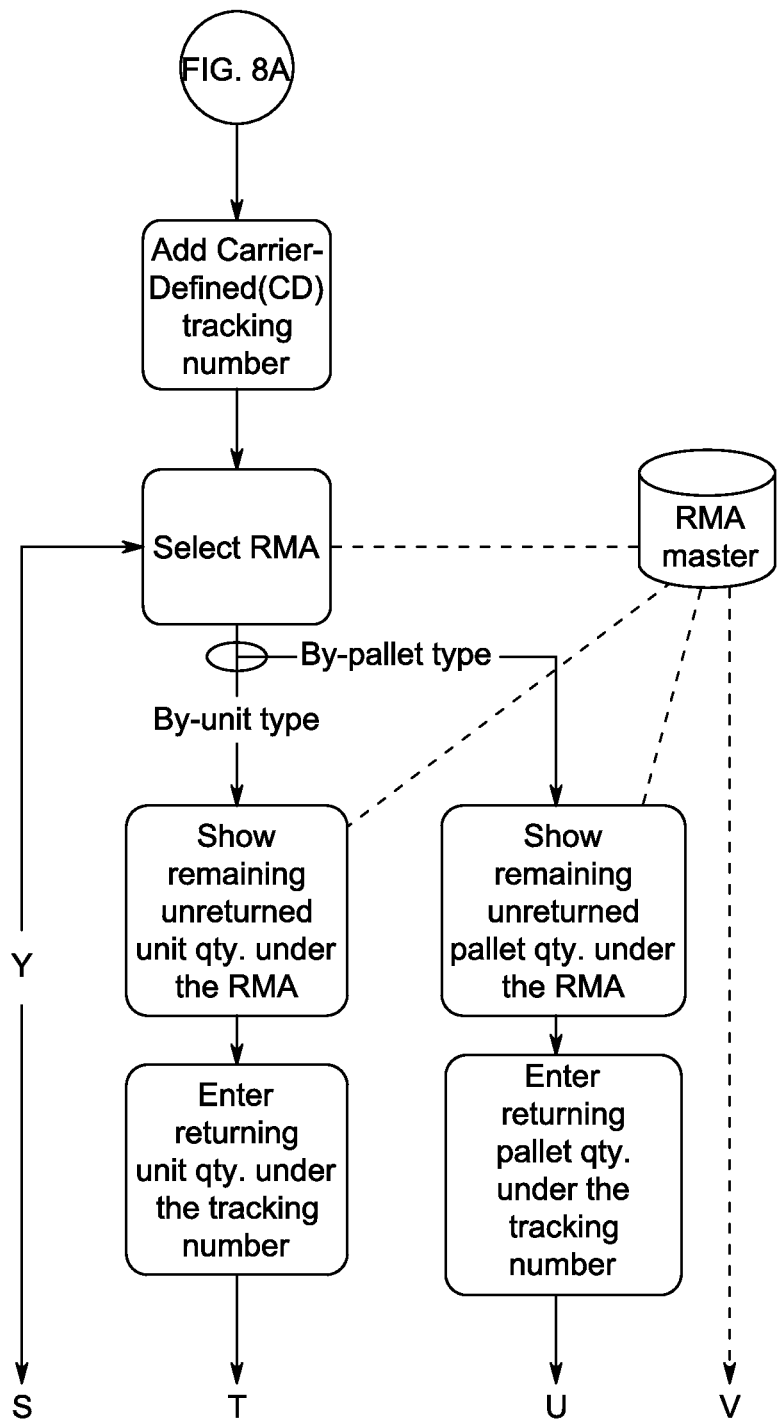
FIGS. 9A and 9B are a block diagram showing creating a new return shipment to select a carrier or shipper following FIGS. 8A and 8B.
Figure 9B:
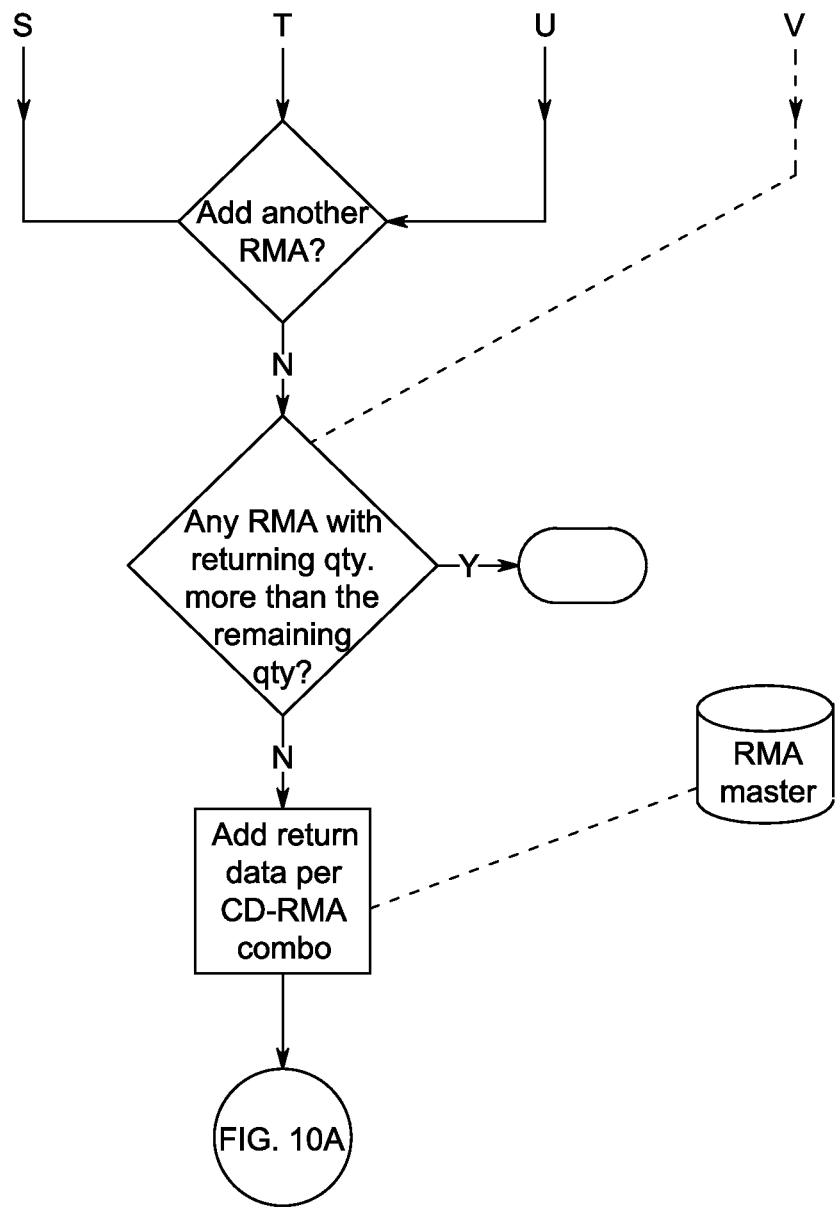
Figure 10A:
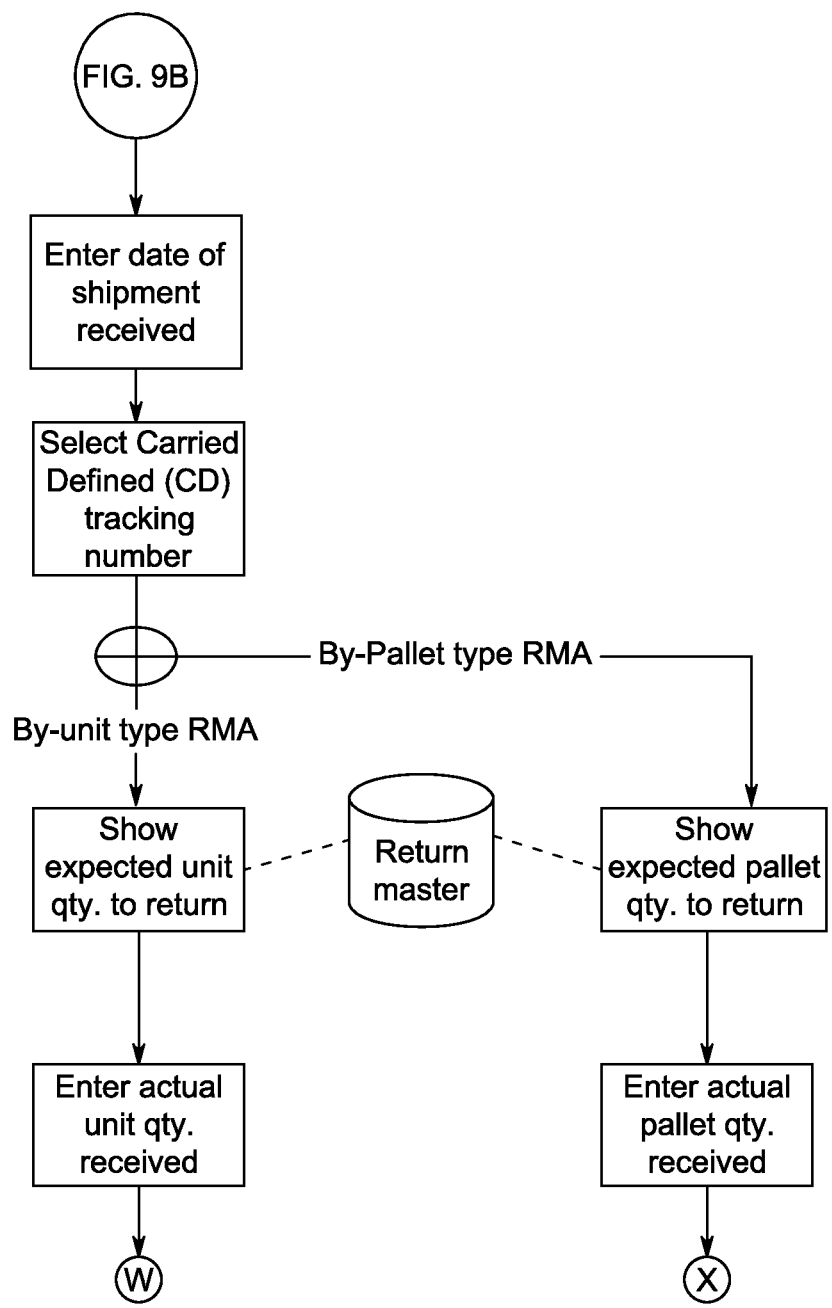
FIGS. 10A and 10B are a block diagram showing validation of return information following FIGS. 9A and 9B, whereby loading a delivered shipment and assigning a unique identifier for shipment and combining with RMA per unit or pallet according to the return contract type of each RMA in the shipment.
Figure 10B:
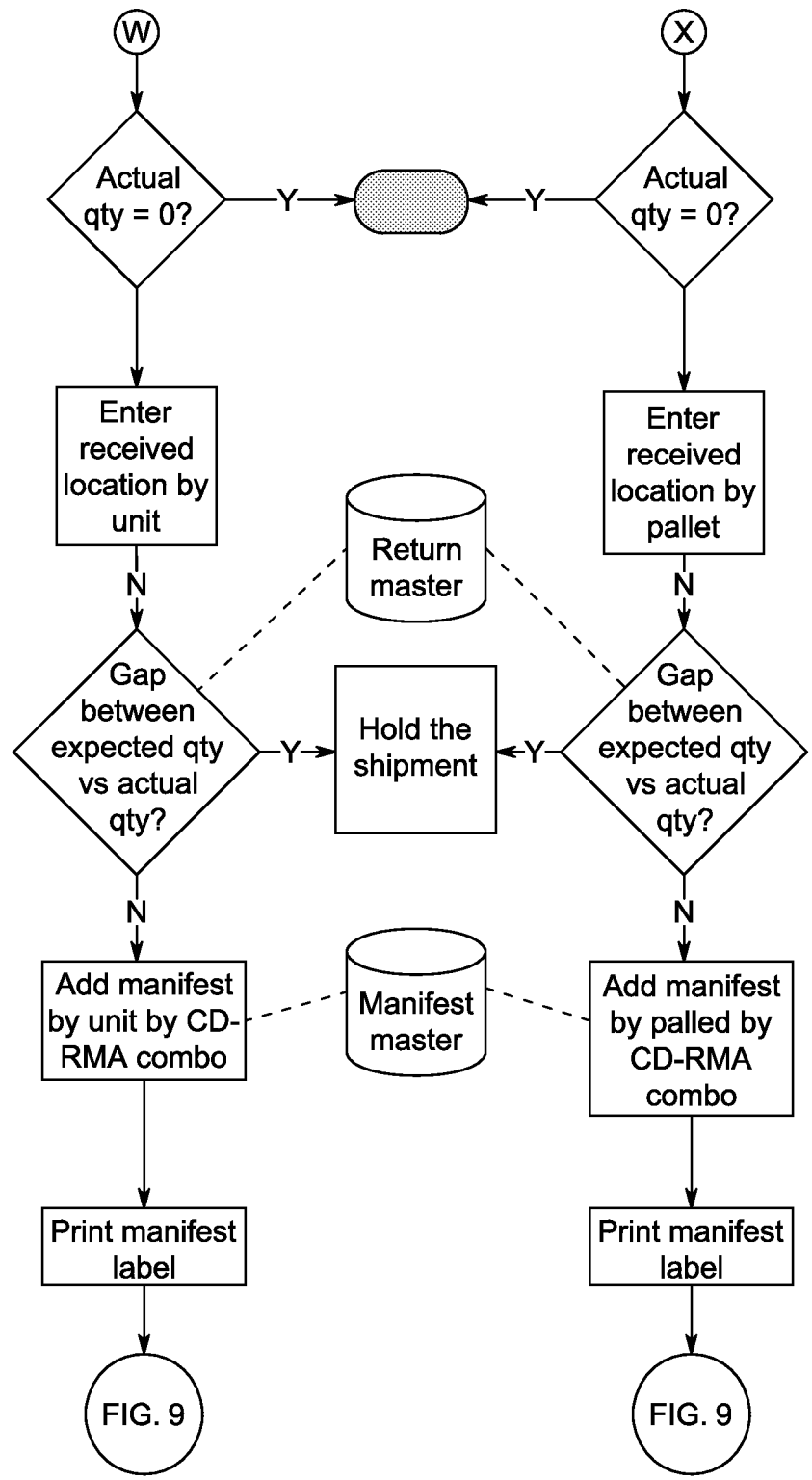
Figure 11A:
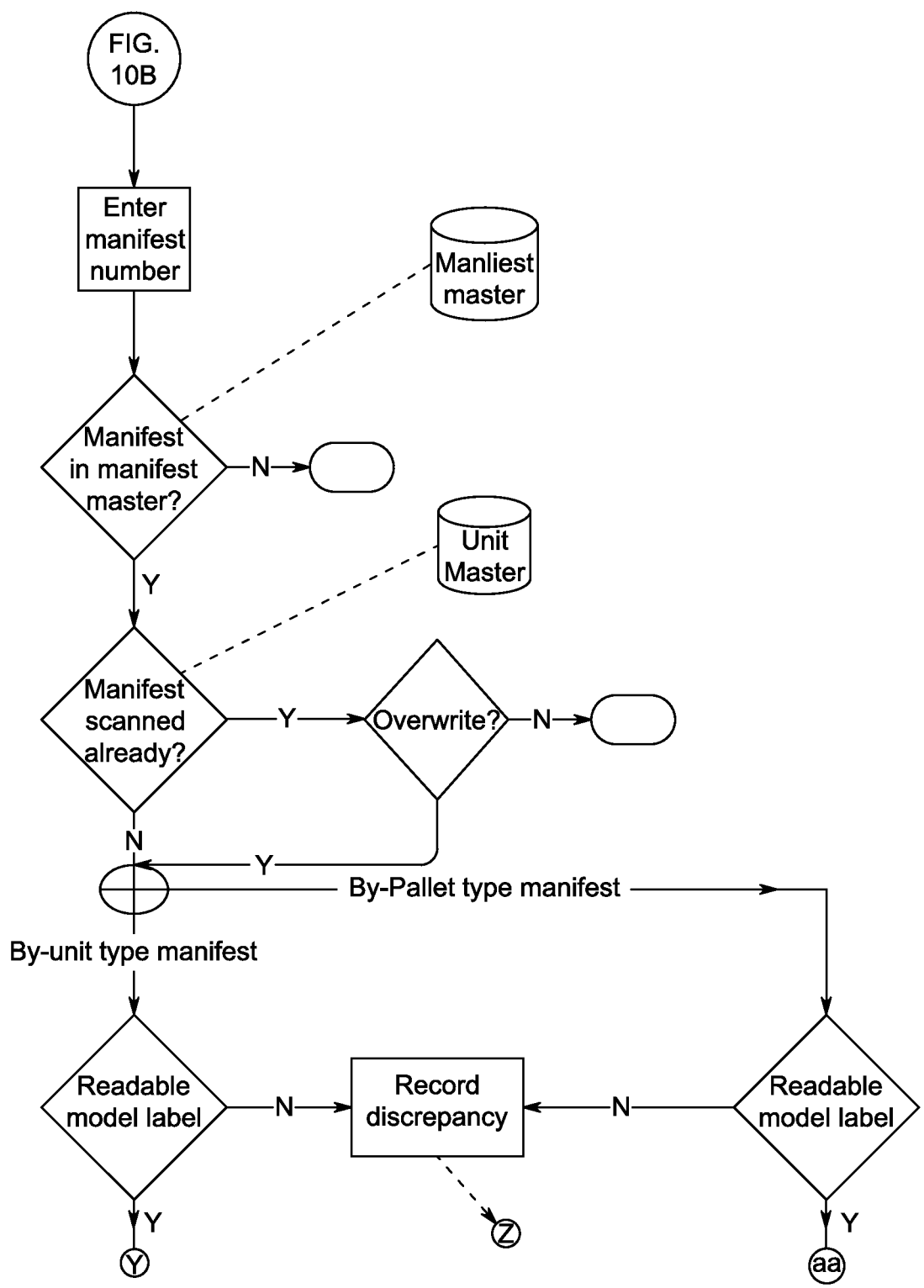
FIGS. 11A to 11D are a block diagram showing determining discrepancies by scanning a unit and assigning a unique identifier to the unit following FIGS. 10A and 10B.
Figure 11B:
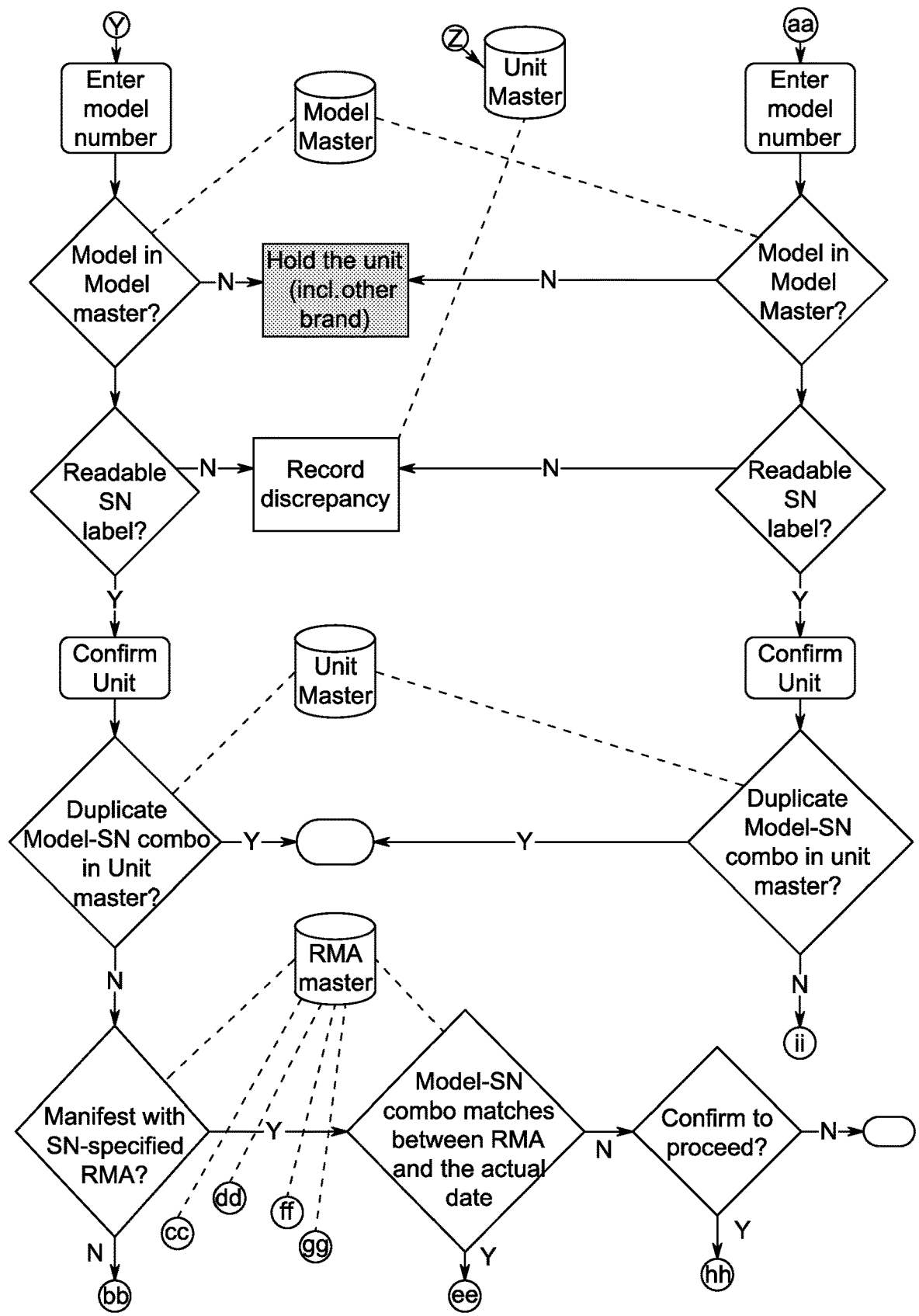
Figure 11C:
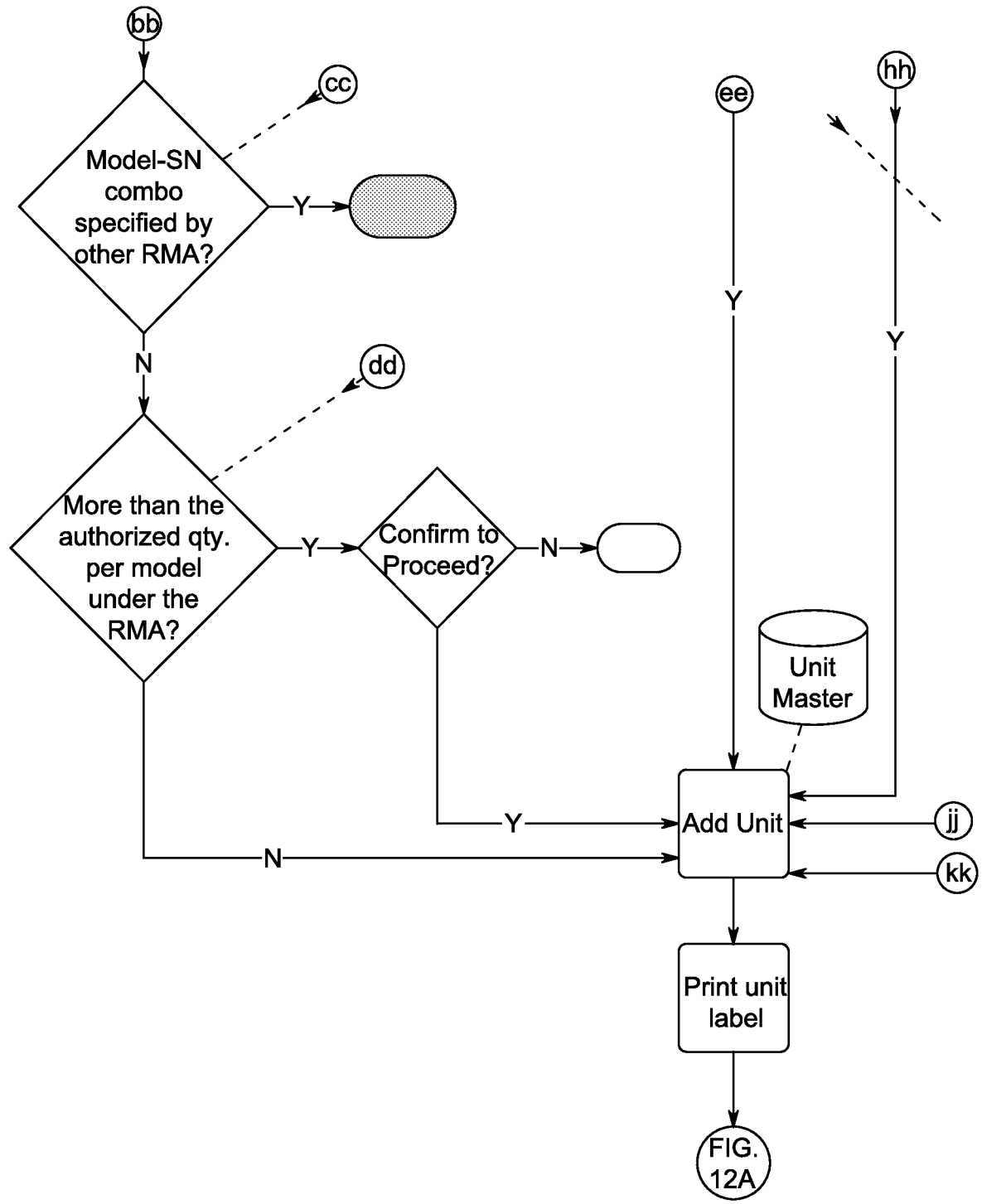
Figure 11D:
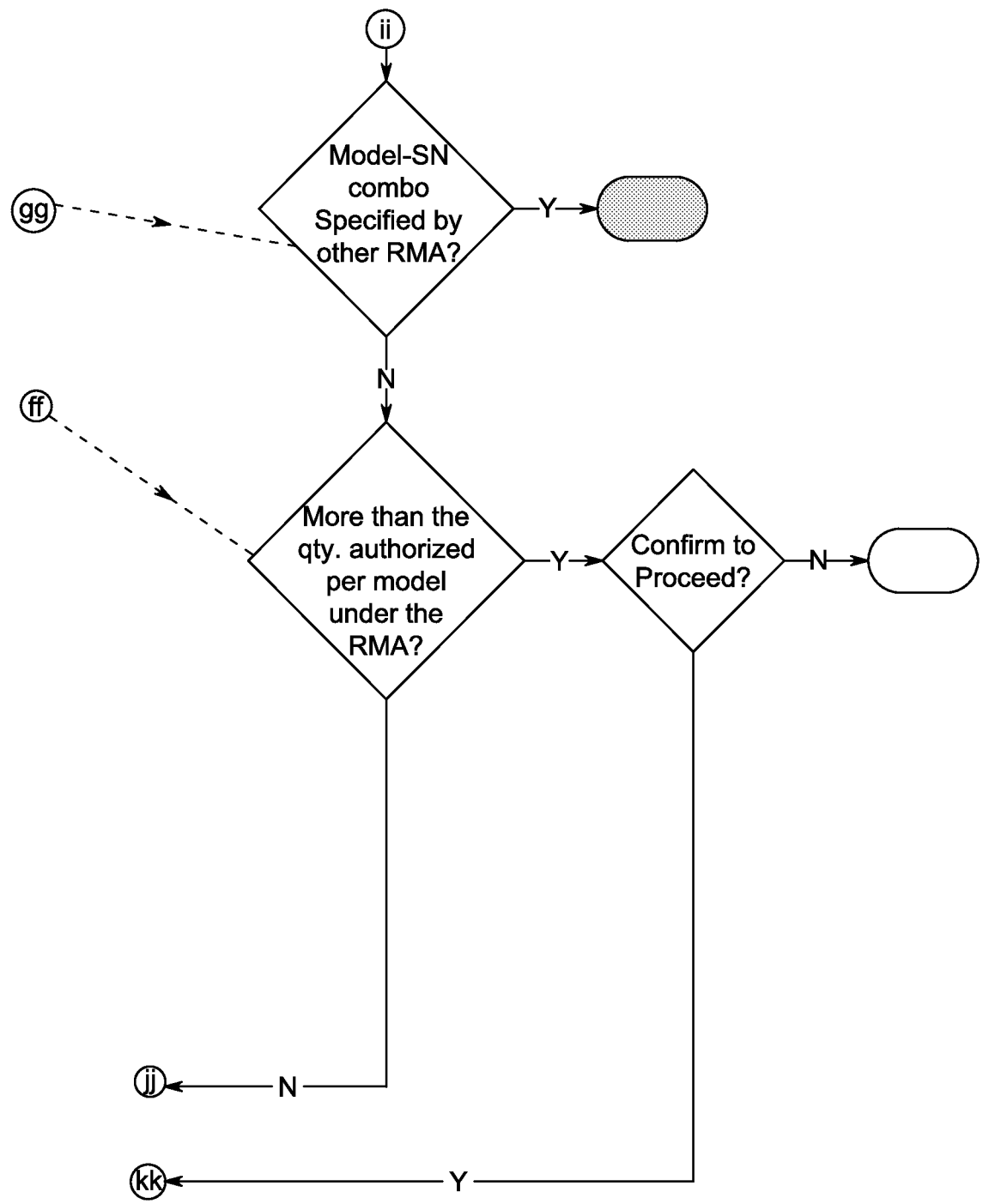
Figure 12A:
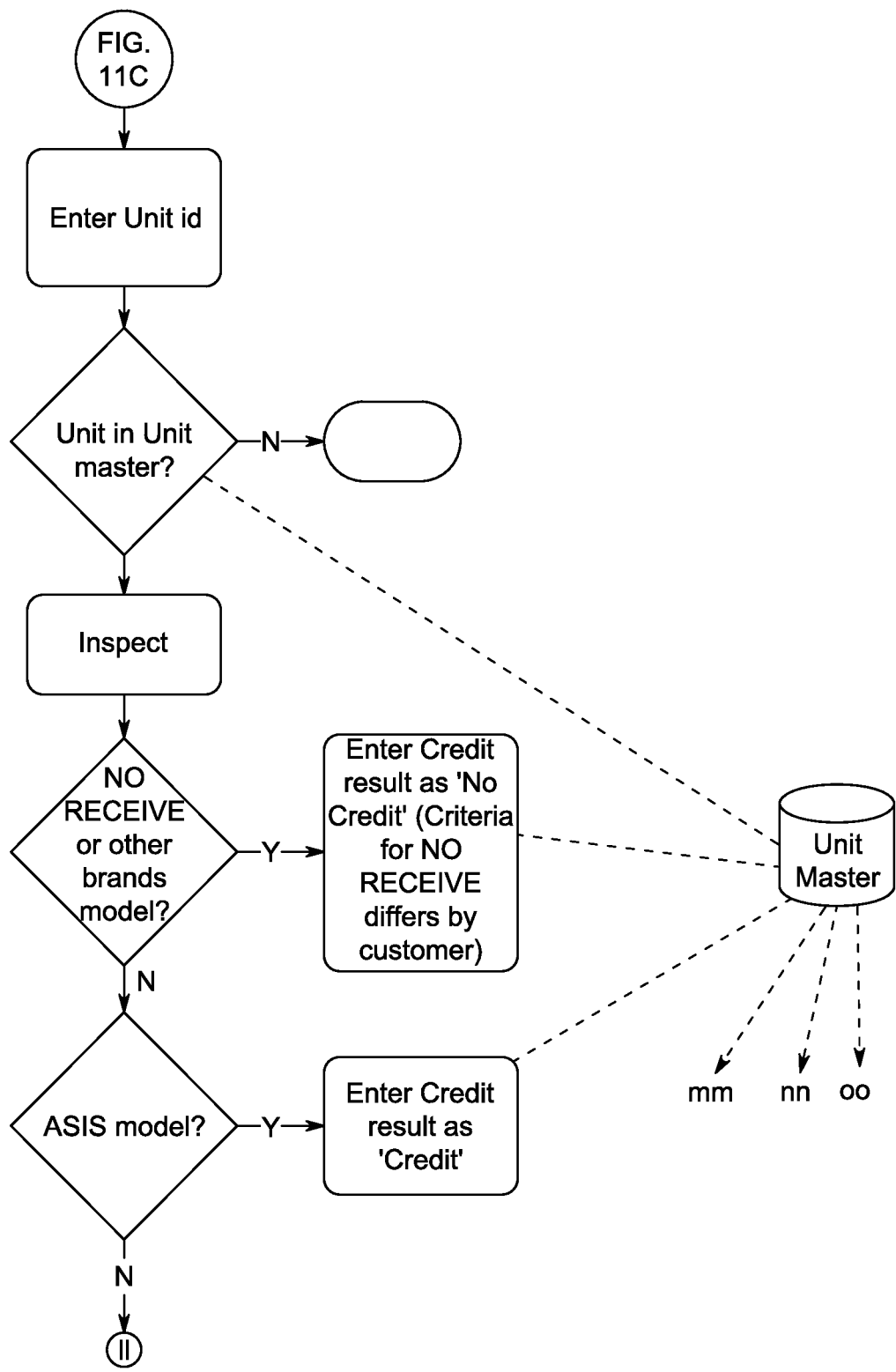
FIGS. 12A and 12B are a block diagram showing inspection following FIGS. 11A to 11D.
Figure 12B:
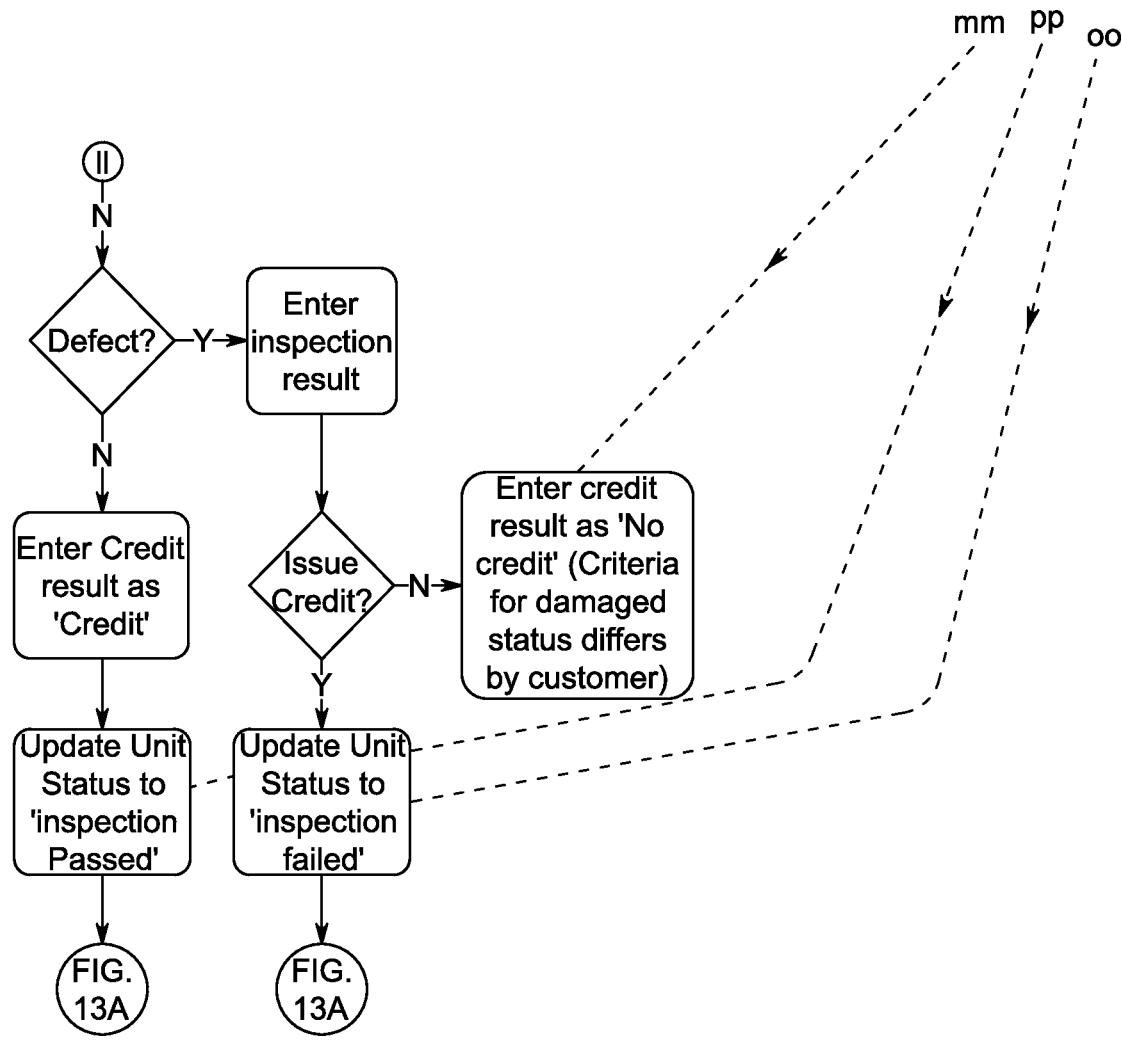
Figure 13A:
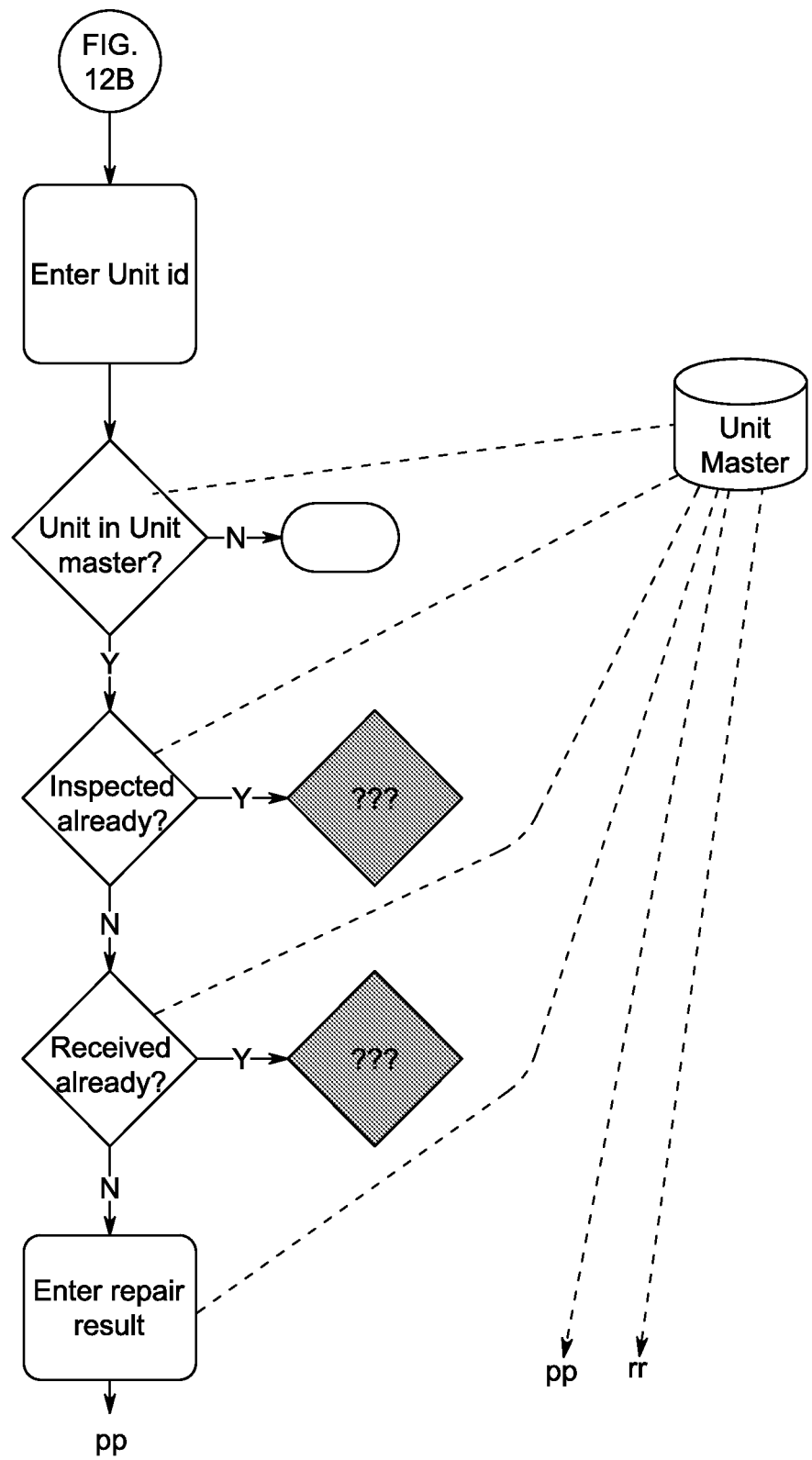
FIGS. 13A and 13B are a block diagram showing repair following FIGS. 12A and 12B.
Figure 13B:
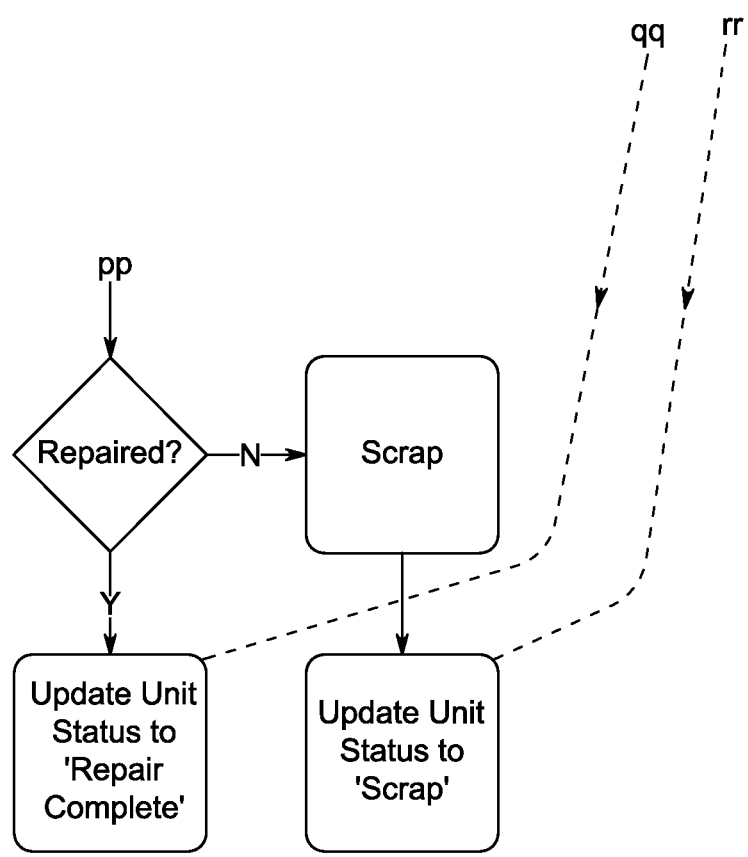

FIGS. 3A to 3B are flow charts showing operation of the illustrated return management platform.

Figure 14:
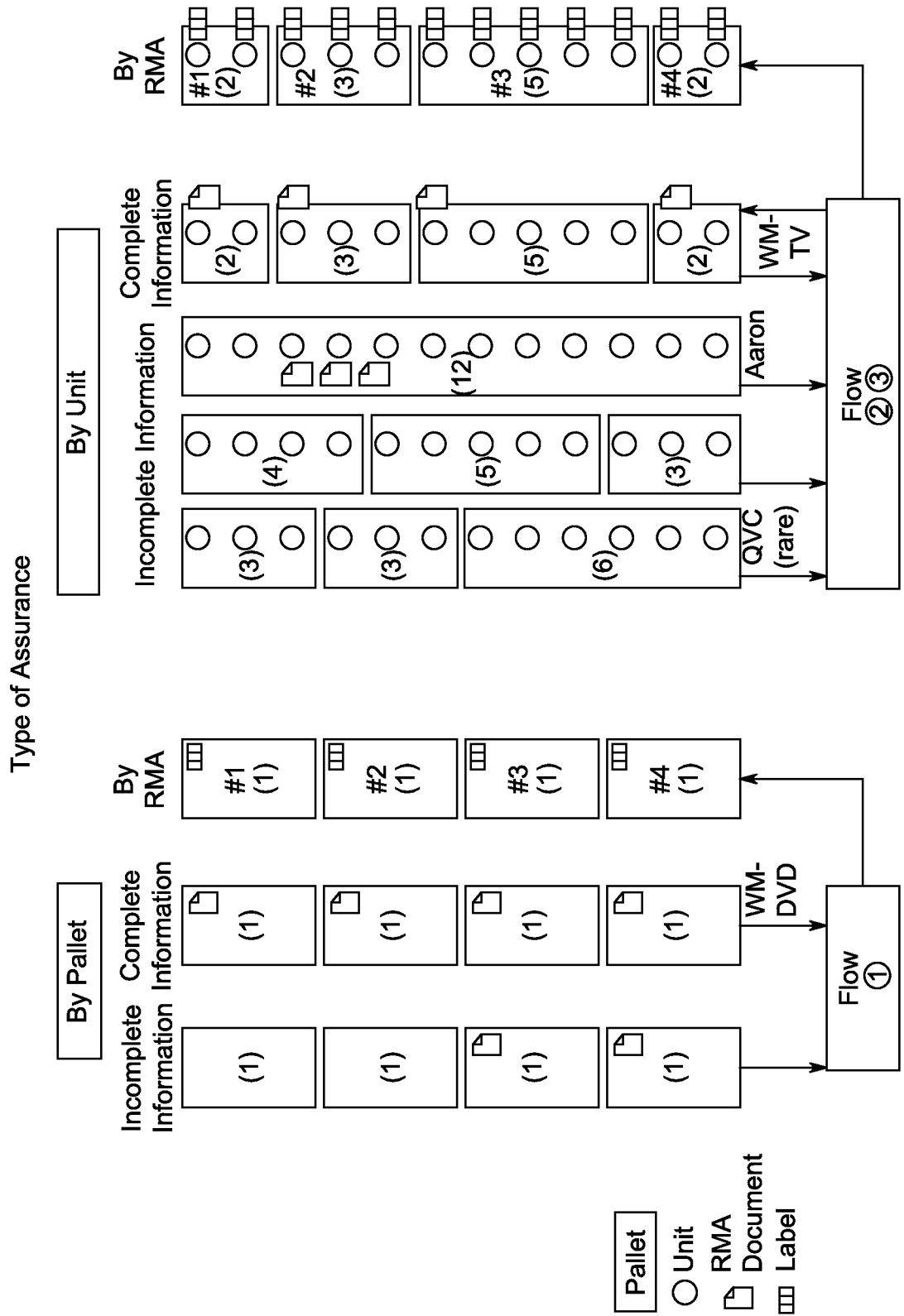
FIG. 14 a diagrammatic view showing the selection of units or pallets.

From the flow charts, it can be seen that return management platform provides at least the following new functions. First, return options are provided for identifying the returned purchased products by units or pallets (see FIG. 14). Second, likely causes of discrepancies are determined and the discrepancies are corrected in real time by collaboration between the return processing party and the return party: (1) discrepancy of data provided (wrong model number, wrong quantity, and wrong serial number); (2) discrepancy arising from process (shipped wrong return items); (3) upon detecting a discrepancy, the return process is only held for serious discrepancies (wrong serial number, wrong shipment) otherwise a record is kept of the discrepancy and the return process continues; and (4) all discrepancies are saved as a record and a quality report can be provided for return party reference. Third, discrepancies by the shipper and the processing party are caught in real time. Discrepancies induced by the processing party include scanning under wrong RMA or under wrong delivery, incomplete/miss scanning, and theft. Discrepancies induced by shipper include wrong delivery, and theft. Fourth, information provided by the RMA is maintained and used even after dividing the RMA into multiple shipments and/or combining multiple RMAs into a single delivery. The return management system assigns a unique identifier for RMA-delivery combination. This unique identifier is referenced in shipping, unloading, and scanning returns. All returns are linked with a unique identifier, which links to the information supplied by the return party 14. Without this capability, the original RMA-related return information is lost in the split or combination/mixture with other RMAs.

Any of the features or attributes of the above the above described embodiments and variations can be used in combination with any of the other features and attributes of the above described embodiments and variations as desired.

It is apparent from the forgoing disclosure and detailed description that the return management platform is effective to improve reverse logistics operations. In particular, the disclosed security systems and methods for reverse logistics operations provide the ability to correct major discrepancies without sacrificing productivity. Without the return management platform, it takes more time to finalize the return information. For example, the return of this month will be delayed from being finalized until next month or later. This delay adds to the accounting burden of reporting lost returns on an accrual basis and then cancelling them. This means that the reliability of financial reporting reduced, as performance is resented on an accrual basis and not a factual basis. Additionally, because the return management platform can detect discrepancies caused by the shipper or the processing party (human error and theft), the return party does not miss the right time to request damages from the responsible party. In other words, late detection will lose the opportunity to claim damages and recover the loss arising from the deviation. Furthermore, the return management platform delivers a report on the accuracy of the RMA submitted by the return party. This report can be used to enhance the quality of the return party and also in training employees involved in the return process.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method for securely managing reverse logistics information of returned products, implemented on an information computing machine, the method comprising the steps of: (a) receiving, by the information computing machine, a plurality of Return Merchandise Authorizations (RMAs), each with returned product information, from a return party; (b) receiving, by the information computing machine, the actual return product information electronically scanned from actual returned product of a shipment received by the return processing party; (c) generating a unique identifier, by the information computing machine, for each unit of product in the shipment upon electronically scanning the return product information and associating the unique identifier with the relevant one of the RMAs for the shipment (d) automatically determining, by the information computing machine, whether there is a discrepancy between the returned product information for a related one of the RMAs from the return party and the actual return product information from the shipment taken by the return processing party; (e) if a minor discrepancy is determined by the information computing machine, automatically saving a record of the minor discrepancy and continuing to process the actual returned product having the minor discrepancy; (f) if a major discrepancy is determined by the information computing machine, automatically holding from further processing the actual returned product having the major discrepancy; and (g) generating a report, by the information computing machine, containing the minor and major discrepancies for review by the return party.

2. The information computing method according to claim 1, further comprising the steps of automatically generating a unique unit or pallet identifier, by the information computing machine, for the shipment per unit or pallet and associating the unique identifier with the relevant one of the RMAs for the shipment.

3. The information computing method according to claim 1, further comprising the steps of receiving, by the information computing machine, requests from the return processing party to separate one of the RMAs into two or more RMAs for separate deliveries and/or combine two or more of the RMAs into a combined RMAs for combined deliveries.

4. The information computing method according to claim 3, further comprising the steps of maintaining, by the information computing machine, information provided by each of the RMAs even after dividing and/or combining any of the RMAs.

5. The information computing method according to claim 1, wherein the electronically scanned return product information includes at least one of a model number and a serial number.

6. The information computing method according to claim 1, wherein the return product information of each of the RMAs includes combination of model numbers, serial numbers, and quantities.

7. The information computing method according to claim 6, wherein the return product information taken from actual returned product includes model numbers, serial numbers, and quantities.

8. A reverse logistics management system comprising: at least one processor; memory storing instructions that, when executed by the at least one processor of the reverse logistics management system, cause the reverse logistics management system to: a. receive, by the information computing machine, a plurality of Return Merchandise Authorizations (RMAs), each with returned product information, from a return party; b. receive, by the information computing machine, the actual return product information electronically scanned from actual returned product of a shipment received by the return processing party; c. generate a unique identifier, by the information computing machine, for each unit of product for the shipment upon electronically scanning the return product information and associating the unique identifier with the relevant one of the RMAs for the shipment d. automatically determine, by the information computing machine, whether there is a discrepancy between the returned product information for a related one of the RMAs from the return party and the actual return product information from the shipment taken by the return processing party; e. if a minor discrepancy is determined by the information computing machine, automatically save a record of the minor discrepancy and continuing to process the actual returned product having the minor discrepancy; f. if a major discrepancy is determined by the information computing machine, automatically hold from further processing the actual returned product having the minor discrepancy; and g. generate a report, by the information computing machine, containing the minor and major discrepancies for review by the return party.

9. The reverse logistics management system according to claim 8, further comprising automatically generate a unique identifier, by the information computing machine, for the shipment per unit or pallet and associating the unique identifier with the relevant one of the RMAs for the shipment.

10. The reverse logistics management system according to claim 8, further comprising receive, by the information computing machine, requests from the return processing party to separate one of the RMAs into two or more RMAs for separate deliveries and/or combine two or more of the RMAs into separate RMAs for combined deliveries.

11. The reverse logistics management system according to claim 10, further comprising maintain, by the information computing machine, information provided by each of the RMAs even after dividing and/or combining any of the RMAs.

12. The reverse logistics management system according to claim 8, wherein the electronically scanned return product information includes at least one of a model number and a serial number.

13. The reverse logistics management system according to claim 8, wherein the return product information of each of the RMAs includes a combination of model numbers, serial numbers, and quantities.

14. The reverse logistics management system according to claim 13, wherein the return product information taken from actual returned product includes model numbers, serial numbers, and quantities.

\* \* \* \* \*